United States Patent
Kim et al.

(10) Patent No.: US 10,229,654 B2
(45) Date of Patent: Mar. 12, 2019

(54) VEHICLE AND METHOD FOR CONTROLLING THE VEHICLE

(71) Applicant: LG ELECTRONICS INC., Seoul (KR)

(72) Inventors: Seongmin Kim, Seoul (KR); Sujin Kim, Seoul (KR); Kihyung Lee, Seoul (KR); Taegil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 246 days.

(21) Appl. No.: 15/341,265

(22) Filed: Nov. 2, 2016

(65) Prior Publication Data

US 2017/0124987 A1    May 4, 2017

(30) Foreign Application Priority Data

Nov. 3, 2015  (KR) .................... 10-2015-0153836

(51) Int. Cl.
*G09G 5/14*    (2006.01)
*B60K 35/00*   (2006.01)
(Continued)

(52) U.S. Cl.
CPC ............... *G09G 5/14* (2013.01); *B60K 35/00* (2013.01); *B60R 1/00* (2013.01); *B60R 11/04* (2013.01); *G06F 3/1423* (2013.01); *G06K 9/00805* (2013.01); *G06K 9/00838* (2013.01); *H04N 7/183* (2013.01); *B60K 2350/106* (2013.01); *B60K 2350/1028* (2013.01); *B60K 2350/1076* (2013.01); *B60K 2350/1084* (2013.01); *B60K 2350/2013* (2013.01); *B60K 2350/2069* (2013.01); *B60K 2350/90* (2013.01); *B60K 2350/906* (2013.01); *B60K 2350/921* (2013.01); *B60R 2011/0026* (2013.01);
(Continued)

(58) Field of Classification Search
CPC ............. G09G 5/14; B60K 35/00; B60R 1/00
USPC ....................................... 348/118
See application file for complete search history.

(56) References Cited

U.S. PATENT DOCUMENTS

2004/0182485 A1* 9/2004 Gomes .................. B60N 2/879
150/154
2004/0215464 A1* 10/2004 Nelson ............... B60R 16/0373
704/275

(Continued)

FOREIGN PATENT DOCUMENTS

EP      2762363 A1    8/2014
JP      2006-159939 A  6/2006
(Continued)

*Primary Examiner* — Jeffery A Williams
(74) *Attorney, Agent, or Firm* — Birch, Stewart, Kolasch & Birch, LLP

(57) ABSTRACT

A vehicle including a plurality of displays disposed at different positions inside the vehicle, each display including a touch screen and a cover layer on a top surface of the touch screen, the cover layer of a corresponding display having a color characteristic based on an interior part of the vehicle having the display such that when the corresponding display is off, the corresponding display appears hidden; a sensor configured to detect a seat location of a person seated in the vehicle; and a controller configured to selectively control the plurality of displays based on the detect seat location of the person seated in the vehicle.

19 Claims, 39 Drawing Sheets

(51) Int. Cl.
   *B60R 1/00* (2006.01)
   *G06F 3/14* (2006.01)
   *G06K 9/00* (2006.01)
   *H04N 7/18* (2006.01)
   *B60R 11/04* (2006.01)
   *B60R 11/00* (2006.01)

(52) U.S. Cl.
   CPC ..... *B60R 2300/20* (2013.01); *B60R 2300/301* (2013.01); *B60R 2300/302* (2013.01); *B60R 2300/307* (2013.01); *B60R 2300/80* (2013.01); *B60R 2300/8093* (2013.01); *G06F 3/1454* (2013.01); *G09G 2354/00* (2013.01); *G09G 2370/16* (2013.01); *G09G 2380/10* (2013.01)

(56) References Cited

U.S. PATENT DOCUMENTS

| | | | |
|---|---|---|---|
| 2005/0177284 A1* | 8/2005 | Kugumiya | H04L 63/0428 701/1 |
| 2007/0053551 A1* | 3/2007 | Kubo | B60R 1/00 382/106 |
| 2007/0273714 A1* | 11/2007 | Hodge | G09G 3/20 345/690 |
| 2009/0174774 A1 | 7/2009 | Kinsley | |
| 2011/0054776 A1* | 3/2011 | Petrov | G01C 21/3694 701/533 |
| 2014/0015971 A1* | 1/2014 | DeJuliis | H04N 7/181 348/148 |
| 2014/0241534 A1* | 8/2014 | Zielinski | H03G 5/005 381/57 |
| 2015/0077235 A1* | 3/2015 | Pisz | B60R 25/104 340/426.23 |
| 2015/0177431 A1* | 6/2015 | Umehara | G02B 5/208 381/333 |
| 2015/0277756 A1* | 10/2015 | Kim | G06F 3/04886 455/566 |
| 2016/0188181 A1* | 6/2016 | Smith | G06F 3/048 715/765 |
| 2017/0043783 A1* | 2/2017 | Shaw | B60H 1/00978 |

FOREIGN PATENT DOCUMENTS

| | | |
|---|---|---|
| KR | 10-2010-0052927 A | 5/2010 |
| KR | 10-2014-0025640 A | 3/2014 |
| KR | 10-1542502 B1 | 8/2015 |
| WO | WO 2015/138782 A1 | 9/2015 |

* cited by examiner

1231

1232

1233

1234
Cross Road

1235

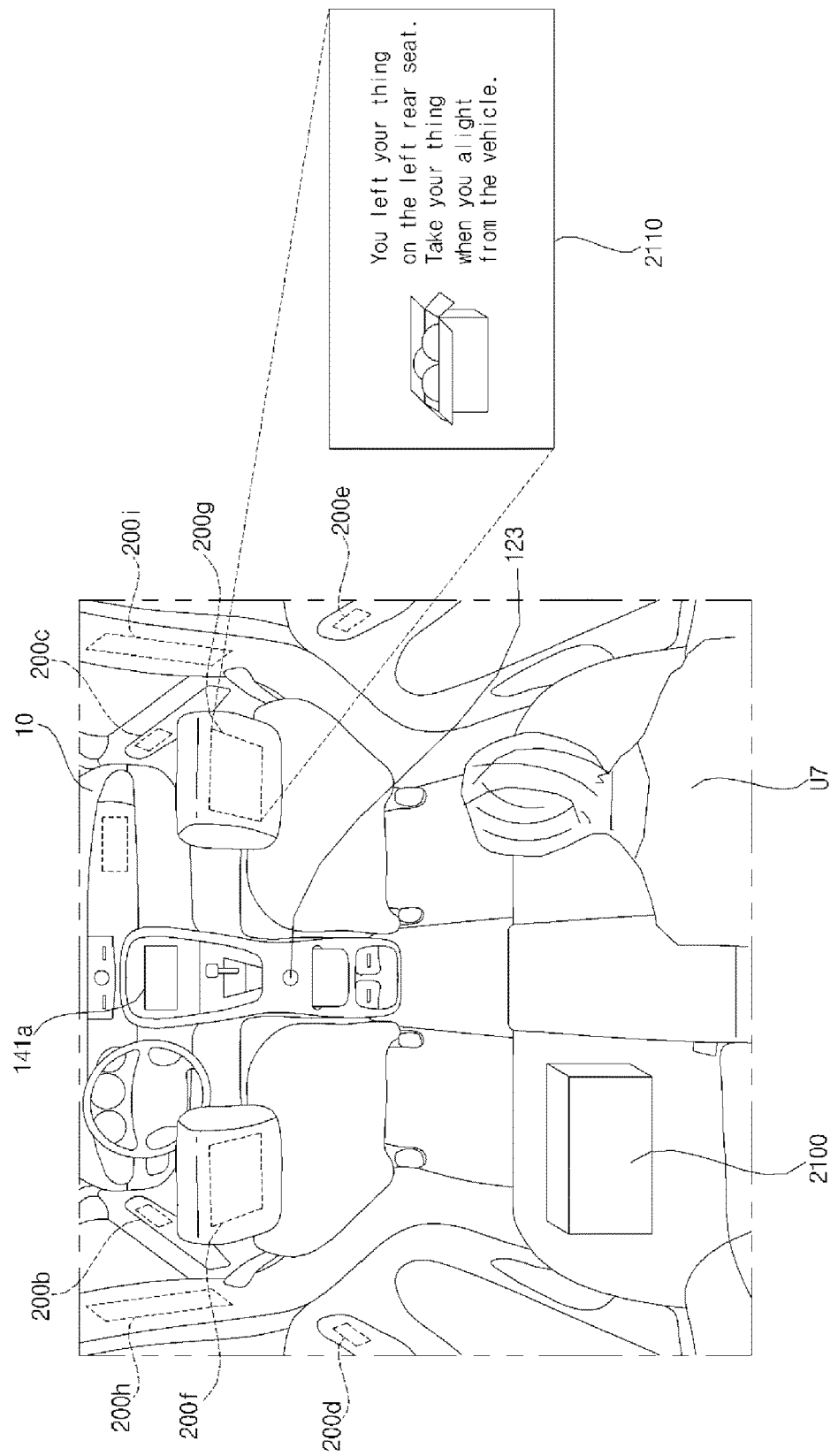

VEHICLE AND METHOD FOR CONTROLLING THE VEHICLE

CROSS REFERENCE TO THE RELATED APPLICATIONS

This application claims the benefit of Korean Patent Application No. 10-2015-0153836, filed on Nov. 3, 2015, which is hereby incorporated by reference as if fully set forth herein.

BACKGROUND OF THE INVENTION

Field of the Invention

The present invention relates generally to a vehicle and a method for controlling the vehicle, and more particularly, to a vehicle equipped with a display having a predetermined light transmittance, and a method for controlling the vehicle.

Discussion of the Related Art

A vehicle refers to a device that carries a passenger or goods from one place to another by driving wheels. For example, a two-wheeled vehicle such as a motor bike, a four-wheeled vehicle such as a sedan, and a train are vehicles.

To increase the safety and convenience of vehicle users, technology is under rapid development to introduce various sensors and electronic devices into vehicles. Especially, a system that provides a lot of functions developed to increase the driving convenience of users, such as smart cruise control and lane maintaining assistance, is installed in a vehicle. Accordingly, autonomous driving is enabled, by which a vehicle travels on a road on its own in consideration of its surroundings without manipulation of a driver.

In this context, demands for a display capable of providing information related to vehicle driving to a user fast and effectively are on the increase. However, if many displays are provided in a vehicle, a user's vision may be distracted. Moreover, even though a display is turned off, the display and its adjacent area are not visually smooth, which makes it difficult to render the interior to be more sophisticated. Further, there is a need for a technique for displaying information intended by users including a driver in time.

SUMMARY OF THE INVENTION

Accordingly, the present invention is directed to a vehicle and a method for controlling the vehicle that substantially obviate one or more problems due to limitations and disadvantages of the related art.

An object of the present invention is to provide a vehicle equipped with at least one display with a cover having a predetermined light transmittance, for mitigating a sense of difference between the display and other interior parts and suppressing distraction of the vision of a user, and a method for controlling the vehicle.

Another object of the present invention is to provide a vehicle for increasing the use convenience of a user by displaying different information on each display according to the position of each user, a traveling situation of the vehicle, a touch input, or the like, and a method for controlling the vehicle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the object and other advantages and in accordance with the purpose of the invention, as embodied and broadly described herein, a vehicle includes at least one display disposed inside the vehicle, and a controller connected to the at least one display, for controlling an operation of the at least one display. Each of the at least one display includes a touch screen, and a cover layer combined on a top surface of the touch screen and having a predetermined light transmittance.

Both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 21A and 21B illustrate an exemplary operation for displaying an alarm indicator on a hidden display in a vehicle according to an embodiment of the present invention.

DETAILED DESCRIPTION OF THE INVENTION

Figure 1:
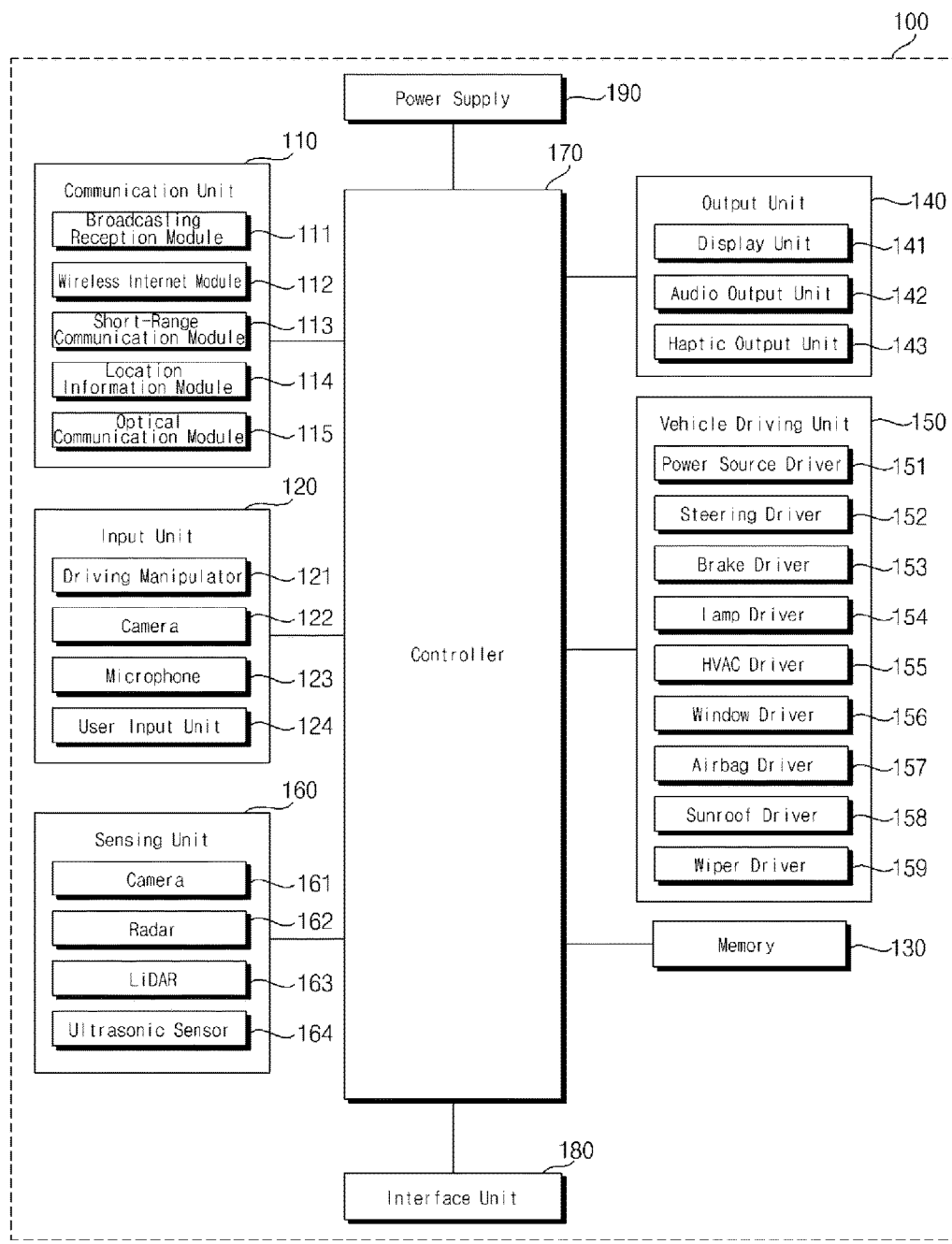
FIG. 1 is a block diagram of a vehicle according to an embodiment of the present invention.

Embodiments disclosed in the present disclosure will be described in detail with reference to the attached drawings. Like reference numerals denote the same or similar components throughout the drawings and a redundant description of the same components will be avoided. The terms with which the names of components are suffixed, 'module' and 'unit' are assigned or interchangeably used with each other, only in consideration of the readiness of specification writing. The terms do not have any distinguishable meanings or roles. Further, the attached drawings are provided to help easy understanding of embodiments disclosed in the present disclosure, not limiting the scope and spirit of the present invention. Thus, the present invention covers all modifications, equivalents, and/or alternatives falling within the scope and spirit of the present invention.

While ordinal numbers including 'first', 'second', etc. may be used to describe various components, they are not intended to limit the components. These expressions may be used to distinguish one component from another component.

When it is said that a component is 'coupled with/to' or 'connected to' another component, it should be understood that the one component is connected to the other component directly or through any other component in between. Further, when it is said that a component is 'directly connected to' or 'directly coupled to' another component, it should be understood that there is no other component between the components.

Singular forms include plural referents unless the context clearly dictates otherwise. In the present disclosure, the term 'have', 'may have', 'include', or 'may include' signifies the presence of a specific feature, number, operation, component, or part, or their combinations, not excluding the presence or addition of one or more other features, numbers, operations, components, or parts, or their combinations.

In the present disclosure, a vehicle may be any of an internal combustion vehicle equipped with an engine as a power source, a hybrid vehicle equipped with an engine and an electrical motor as power sources, an electric vehicle equipped with an electrical motor as a power source, and the like.

FIG. 1 is a block diagram of a vehicle 100 according to an embodiment of the present invention. Referring to FIG. 1, the vehicle 100 may include a communication unit 110, an input unit 120, a memory 130, an output unit 140, a vehicle driving unit 150, a sensing unit 160, a controller 170, an interface unit 180, and a power supply 190.

The communication unit 110 may include one or more modules that enable wireless communication between the vehicle 100 and an external device (for example, a portable terminal, an external server, or another vehicle). Also, the communication unit 110 may include one or more modules that connect the vehicle 100 to one or more networks.

The communication unit 110 may include a broadcasting reception module 111, a wireless Internet module 112, a short-range communication module 113, a location information module 114, and an optical communication module 115.

The broadcasting reception module 111 receives a broadcast signal or broadcasting information from an external broadcasting management server through a broadcast channel. Herein, broadcasting covers radio broadcasting or TV broadcasting.

The wireless Internet module 112 refers to a module used for wireless Internet connectivity, and may reside inside or outside the vehicle 100. The wireless Internet module 112 is configured to transmit and receive wireless signals over a communication network compliant with a wireless Internet technique.

Wireless Internet techniques include, for example, Wireless Local Area Network (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. The wireless Internet module 112 transmits and receives data according to at least one of wireless Internet techniques that include other Internet techniques in addition to the above enumerated ones. For example, the wireless Internet module 112 may exchange data wirelessly with an external server. The wireless Internet module 112 may receive weather information and traffic information (for example, Transport Protocol Expert Group (TPEG) information) from the external server.

The short-range communication module 113 is used for short-range communication. The short-range communication module 113 may support short-range communication using at least one of Bluetooth™, Radio Frequency Identification (RFID), Infrared Data Association (IrDA), Ultra Wideband (UWB), ZigBee, Near Field Communication (NFC), Wi-Fi, Wi-Fi Direct, Wireless Universal Serial Bus (Wireless USB).

The short-range communication module 113 may conduct short-range communication between the vehicle 100 and at least one external device by establishing a short-range wireless communication network. For example, the short-range communication module 113 may exchange data wirelessly with a portable terminal of a passenger. The short-range communication module 113 may receive weather information and traffic information (for example, TPEG information) from the portable terminal or the external server. For example, if a user is aboard the vehicle 100, a portable terminal of the user and the vehicle 100 may be paired with each other automatically or upon execution of an application by the user.

The location information module 114 is a module configured to determine a location of the vehicle 100. A major example of the location information module 114 is a Global Positioning System (GPS) module. For example, the location of the vehicle 100 may be acquired using signals received from GPS satellites at the GPS module.

The optical communication module 115 may include an optical transmitter and an optical receiver. The optical receiver may receive information by converting an optical signal to an electrical signal. The optical receiver may include a Photo Diode (PD) for receiving light. The PD may convert light to an electrical signal. For example, the optical receiver may receive information about a preceding vehicle by light emitted from a light source included in the preceding vehicle.

The optical transmitter may include at least one light emitting device for converting an electrical signal to an optical signal. The light emitting device is preferably a Light Emitting Diode (LED). The optical transmitter converts an electrical signal to an optical signal and outputs the optical signal to the outside. For example, the optical transmitter may emit an optical signal to the outside by flickering a light emitting device corresponding to a predetermined frequency. According to an embodiment, the optical transmitter may include a plurality of light emitting device arrays. According to an embodiment, the optical transmitter may be integrated with a lamp provided in the vehicle 100. For example, the optical transmitter may be at least one of a head lamp, a tail lamp, a brake lamp, a turn signal lamp, and a position lamp. For example, the optical communication module 115 may exchange data with another vehicle by optical communication.

The input unit 120 may include a driving manipulator 121, a microphone 123, and a user input unit 124.

The driving manipulator 121 receives a user input for driving the vehicle 100. The driving manipulator 121 may include a steering input mechanism, a shift input mechanism, an acceleration input mechanism, and a brake input mechanism.

The steering input mechanism receives a traveling direction input for the vehicle 100 from the user. The steering input mechanism may include a steering wheel. According to an embodiment, the steering input mechanism may be configured as a touch screen, a touchpad, or a button.

Further, the shift input mechanism receives a parking (P) input, a drive (D) input, a neutral (N) input, and a reverse (R) input for the vehicle 100 from the user. The shift input mechanism is preferably formed into a lever. According to an embodiment, the shift input mechanism may be configured as a touch screen, a touchpad, or a button.

In addition, the acceleration input mechanism receives an acceleration input for the vehicle 100 from the user. The brake input mechanism receives a deceleration input for the vehicle 100 from the user. The acceleration input mechanism and the brake input mechanism are preferably formed into pedals. According to an embodiment, the acceleration input mechanism or the brake input mechanism may be configured as a touch screen, a touchpad, or a button.

A camera 122 is disposed at a part inside the vehicle 100 and generates an image of the inside of the vehicle. For example, the camera 122 may be disposed at various positions of the vehicle 100, for example, on the surface of a dashboard, on the surface of a roof, or at a rear view mirror, and capture a passenger in the vehicle 100. In this instance, the camera 122 may generate an inside image of an area including a driver's seat in the vehicle 100.

Also, the camera 122 may generate an inside image of an area including the driver's seat and a passenger seat in the vehicle 100. An inside image generated by the camera 122 may be a two-dimensional (2D) image and/or a three-dimensional (3D) image. To generate a 3D image, the camera 122 may include at least one of a stereo camera, a depth camera, and a 3D laser scanner. The camera 122 may provide its generated inside image to the controller 170 operatively coupled with the camera 122. The camera 122 may be referred to as an 'internal camera'.

The controller 170 can detect various objects by analyzing an inside image received from the camera 122. For example, the controller 170 can detect the driver's gaze and/or gesture from a part of the inside image, corresponding to an area of the driver's seat. In another example, the controller 170 can detect a passenger's gaze and/or gesture from a part of the inside image, corresponding to an area other than the area of the driver's seat. Obviously, the driver's gaze and/or gesture and the passenger's gaze and/or gesture may be detected simultaneously.

The microphone 123 may process an external sound signal to electrical data. The processed data may be used in various manners according to a function being executed in the vehicle 100. The microphone 123 may convert a voice command of a user to electrical data. The converted electrical data may be provided to the controller 170. In addition, according to an embodiment, the camera 122 or the microphone 123 may be included in the sensing unit 160, instead of the input unit 120.

The user input unit 124 is configured to receive information from the user. Upon input of information through the user input unit 124, the controller 170 can control an operation of the vehicle 100 in correspondence with the input information. The user input unit 124 may include a touch input mechanism or a mechanical input mechanism. According to an embodiment, the user input unit 124 may be disposed in an area of a steering wheel. In this instance, the driver may manipulate the user input unit 124 with his or her finger, while grabbing the steering wheel.

The input unit 120 may include a plurality of buttons or a touch sensor and perform various input operations through the plurality of buttons or the touch sensor.

The sensing unit 160 senses a signal related to traveling of the vehicle 100. For this purpose, the sensing unit 160 may include a collision sensor, a steering sensor, a speed sensor, an inclination sensor, a weight sensor, a heading sensor, a yaw sensor, a gyro sensor, a position module, a vehicle forwarding/backwarding sensor, a battery sensor, a fuel sensor, a tire sensor, a hand rotation-based steering sensor, a vehicle internal temperature sensor, a vehicle internal humidity sensor, an ultrasonic sensor, an infrared sensor, a radar, a Light Detection And Ranging (LiDAR), and the like.

Accordingly, the sensing unit 160 may acquire sensing signals for vehicle collision information, vehicle heading information, vehicle location information (GPS information), vehicle angle information, vehicle speed information, vehicle acceleration information, vehicle inclination information, vehicle forwarding/backwarding information, battery information, fuel information, tire information, vehicle lamp information, vehicle internal temperature information, vehicle internal humidity information, a steering wheel rotation angle, and the like.

Also, the controller 170 can generate a control signal for acceleration, deceleration, direct change, or the like of the vehicle 100 based on ambient environment information acquired by at least one of a camera, an ultrasonic sensor, an infrared sensor, a radar, and a LiDAR of the vehicle 100. The ambient environment information may be information related to various objects within a predetermined distance range from the traveling vehicle 100. For example, the ambient environment information may include information about the number of obstacles within 100 m from the vehicle 100, the distances to the obstacles, the sizes of the obstacles, the sizes of the obstacles, and the like.

In addition, the sensing unit 160 may further include an acceleration pedal sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, a Crank Angle Sensor (CAS), and the like.

The sensing unit 160 may include a biometric sensing unit. The biometric sensing unit senses and acquires biometric information about a passenger. The biometric information may include finger print information, iris scan information, retina scan information, hand geometry information, facial recognition information, and voice recognition information. The biometric sensing unit may include a sensor for sensing biometric information about a passenger. Herein, the camera 122 and the microphone 123 may operate as sensors. The biometric sensing unit may acquire hand geometry information and facial recognition information through the camera 122.

The sensing unit 160 may include at least one camera 161 for capturing the outside of the vehicle 100. The at least one camera 161 may be referred to as an 'external camera'. For example, the sensing unit 160 may include a plurality of cameras 161 disposed at different positions on the exterior of the vehicle 100. Each camera 161 may include an image sensor and an image processing module. The camera 161 may process a still image or a video acquired through the image sensor (for example, a Charged Coupled Device (CCD) or Complementary Metal Oxide Semiconductor (CMOS) image sensor). The image processing module may extract necessary information by processing the still image or video acquired through the image sensor and provide the extracted information to the controller 170.

The camera 161 may include an image sensor (for example, a CMOS or CCD image sensor) and an image processing module. The camera 161 may also process a still image or a video acquired through the image sensor. The image processing module may process the still image or video acquired through the image sensor. The camera 161 may also acquire an image including at least one of a signal light, a traffic sign, a pedestrian, another vehicle, and a road surface.

The output unit 140 is configured to output information processed by the controller 170. The output unit 140 may include a display unit 141, an audio output unit 142, and a haptic output unit 143.

The display unit 141 may include at least one display and display information processed by the controller 170 on each display. For example, the display unit 141 may display vehicle-related information. The vehicle-related information may include vehicle control information for direct control of the vehicle or vehicle driving assist information for guiding driving of the driver. Also, the vehicle-related information may include vehicle state information indicting the current state of the vehicle or vehicle traveling information related to traveling of the vehicle.

The display unit 141 may include at least one of a Liquid Crystal Display (LCD), a Thin Film Transistor-Liquid Crystal Display (TFT LCD), an Organic Light Emitting Diode (OLED), a flexible display, a 3D display, and an e-ink display.

The display unit 141 may include at least one display. If the display unit 141 includes a plurality of displays, each display may include a touch screen which forms a mutual layer structure with a touch sensor or is integrated with the touch sensor. Each display may be disposed at a different position inside the vehicle 100. For example, one display may be disposed on a passenger seat side of a dashboard of the vehicle 100, and another display may be disposed on the rear surface of the head rest of the driver's seat. In an embodiment, the display unit 141 may include a later-described display 200.

The touch screen may serve as an output interface between the vehicle 100 and a user as well as the user input unit 124 that provides an input interface between the vehicle 100 and the user.

In this instance, the display unit 141 may include a touch sensor for sensing a touch on the display unit 141 in order to receive a control command in a touch manner. Thus, when the display unit 141 is touched, the touch sensor may sense the touch, and thus the controller 170 can generate a control command corresponding to the touch. Content input by a touch may be a character, a number, or an indication or selectable menu item in various modes.

In addition, the display unit 141 may include a cluster so that the driver may check vehicle state information or vehicle traveling information, while driving the vehicle 100. The cluster may be positioned on the dashboard. In this instance, the driver may view information displayed on the cluster, while gazing ahead of the vehicle 100.

According to an embodiment, the display unit 141 may include a Head Up Display (HUD). The HUD may include a projection module and thus output display light corresponding to predetermined information toward a windshield under the control of the controller 170. Accordingly, a user may view a virtual image corresponding to the predetermined information on the windshield.

The audio output unit 142 converts an electrical signal received from the controller 170 to an audio signal. For this purpose, the audio output unit 142 may include a speaker. The audio output unit 142 may output a sound corresponding to an operation of the user input unit 124.

The haptic output unit 143 generates a haptic output. For example, the haptic output unit 143 may vibrate the steering wheel, a safety belt, or a seat so that the user may recognize an output.

The vehicle driving unit 150 may control an operation of various devices of the vehicle 100. The vehicle driving unit 150 may include at least one of a power source driver 151, a steering driver 152, a brake driver 153, a lamp driver 154, a Heating, Ventilating, and Air Conditioning (HVAC) driver 155, a window driver 156, an airbag driver 157, a sunroof driver 158, and a wiper driver 159.

The power source driver 151 may perform electronic control on a power source in the vehicle 100. The power source driver 151 may include an accelerator for increasing the speed of the vehicle 100, and a decelerator for decreasing the speed of the vehicle 100.

For example, if a fossil fuel-based engine is a power source, the power source driver 151 may perform electronic control on the engine. Therefore, the power source driver 151 may control the output torque of the engine. If the power source driver 151 is an engine, the power source driver 151 may restrict the speed of the vehicle by limiting the engine output torque under the control of the controller 170.

In another example, if an electrical motor is a power source, the power source driver 151 may control the motor. Thus, the rotation speed and torque of the motor may be controlled.

The steering driver 152 may include a steering device. Thus, the steering driver 152 may perform electronic control on the steering device in the vehicle 100. For example, the steering driver 152 may include a steering torque sensor, a steering angle sensor, and a steering motor, and a steering torque applied to the steering wheel by the driver may be sensed by the steering torque sensor. The steering driver 152 may control a steering force and a steering angle by changing the intensity and direction of current applied to the steering motor based on the speed and steering torque of the vehicle 100.

Also, the steering driver 152 may determine whether the traveling direction of the vehicle is properly controlled based on information about the steering angle acquired through the steering angle sensor. Thus, the steering driver 152 may change the traveling direction of the vehicle 100. Further, the steering driver 152 may increase a feeling of weight for the steering wheel by increasing the steering force of the steering motor during slow traveling of the vehicle 100, and decrease a feeling of weight for the steering wheel by decreasing the steering force of the steering motor during fast traveling of the vehicle 100.

If an autonomous driving function of the vehicle 100 is executed, the steering driver 152 may control the steering motor to exert an appropriate steering force based on a sensing signal received from the sensor 160 or a control signal received from the controller 170, even though the driver manipulates the steering wheel (for example, in a situation where a steering torque is not sensed).

The brake driver 153 may perform electronic control on a brake device in the vehicle 100. For example, the brake driver 153 may decrease the speed of the vehicle 100 by controlling an operation of a brake disposed at a tire. In another example, the traveling direction of the vehicle 100 may be adjusted to the left or right by differentiating operations of brakes disposed respectively at left and right tires.

The lamp driver 154 may control turn-on/turn-off of at least one lamp inside or outside the vehicle 100. Also, the lamp driver 154 may include a lighting device. Also, the lamp driver 154 may control the intensity, direction, and the like of light from a lamp. For example, the lamp driver 154 may control a turn signal lamp, a head lamp, a brake lamp, and the like.

The HVAC driver 155 may perform electronic control on a HVAC unit in the vehicle 100. For example, if a vehicle internal temperature is high, the HVAC unit may be controlled to operate and supply cool air into the vehicle 100.

The window driver 156 may perform electronic control on a window device in the vehicle 100. For example, opening and closing of left and right side windows of the vehicle 100 may be controlled.

The airbag driver 157 may perform electronic control on an airbag device in the vehicle 100. For example, the airbag driver 157 may control inflation of an airbag in an emergency situation.

The sunroof driver 158 may perform electronic control on a sunroof device in the vehicle 100. For example, the sunroof driver 158 may control opening or closing of the sunroof.

The wiper driver 159 may perform electronic control on wipers 14a and 14b provided in the vehicle 100. For example, upon receipt of a user input commanding operation of the wipers 14a and 14b through the user input unit 124, the wiper driver 159 may electronically control the number and speed of wipes according to the user input. In another example, the wiper driver 159 may automatically drive the wipers 14a and 14b without receiving a user input by determining the amount or intensity of rain based on a sensing signal of a rain sensor included in the sensing unit 160.

In addition, the vehicle driving unit 150 may further include a suspension driver. The suspension driver may perform electronic control on a suspension device in the vehicle 100. For example, if the surface of a road is rugged, the suspension driver may control the suspension device to reduce jerk of the vehicle 100.

The memory 130 is electrically connected to the controller 170. The memory 130 may store basic data for a unit, control data for controlling an operation of the unit, and input and output data. The memory 130 may be any of various storage devices in hardware, such as Read Only Memory (ROM), Random Access Memory (RAM), Erasable and Programmable ROM (EPROM), flash drive, hard drive, etc. The memory 130 may store various data for overall operations of the vehicle 100, such as programs for processing or controlling in the controller 170.

The interface unit 180 may serve as paths to various types of external devices connected to the vehicle 100. For example, the interface unit 180 may include a port connectable to a portable terminal. The interface unit 180 may be connected to the portable terminal through the port. In this instance, the interface unit 180 may exchange data with the portable terminal.

In addition, the interface unit 180 may receive turn signal information. The turn signal information may be a turn-on signal for a turn signal lamp for left turn or right turn, input by the user. Upon receipt of a turn-on input for a left or right turn signal lamp through the user input unit (124 in FIG. 1) of the vehicle 100, the interface unit 180 may receive left or right turn signal information.

The interface unit 180 may receive vehicle speed information, information about a rotation speed of the steering wheel, or gear shift information. The interface unit 180 may receive the vehicle speed information, the information about a rotation speed of the steering wheel, or the gear shift information, which is sensed through the sensing unit 160 of the vehicle 100. Or the interface unit 180 may receive the vehicle speed information, the information about a rotation speed of the steering wheel, or the gear shift information from the controller 170 of the vehicle 100. The gear shift information may be information indicating a state in which a shift lever of the vehicle 100 is placed. For example, the gear shift information may be information indicating a state in which the shift lever is placed among P, R, N, D, and first-stage to multi-stage gear states.

The interface unit 180 may receive a user input through the user input unit 124 of the vehicle 100. The interface unit 180 may receive the user input directly from the input unit 124 of the vehicle 100 or through the controller 170.

The interface unit 180 may receive information acquired from an external device. For example, when traffic light change information is received from an external server through the communication unit 110 of the vehicle 100, the interface unit 180 may receive the traffic light change information from the controller 170.

The controller 170 can provide overall control to each unit inside the vehicle 100. The controller 170 can be referred to as an Electronic Control Unit (ECU).

The controller 170 can be implemented in hardware using at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a processor, a controller, a micro-controller, a microprocessor, and an electrical unit for executing other functions.

The power supply 190 may supply power needed for operating each component under the control of the controller 170. Particularly, the power supply 190 may receive power from a battery within the vehicle 100.

An Audio Video Navigation (AVN) device may exchange data with the controller 170. The controller 170 can receive navigation information from the AVN device or a separate navigation device. The navigation information may include information about a destination that has been set, information about a route to the destination, map information related to vehicle traveling, or information about a current location of the vehicle.

In addition, a part of the components illustrated in FIG. 1 may not be mandatory for implementation of the vehicle 100. Accordingly, the vehicle 100 described in the present disclosure may include more or fewer components than the above enumerated ones.

Figure 2:
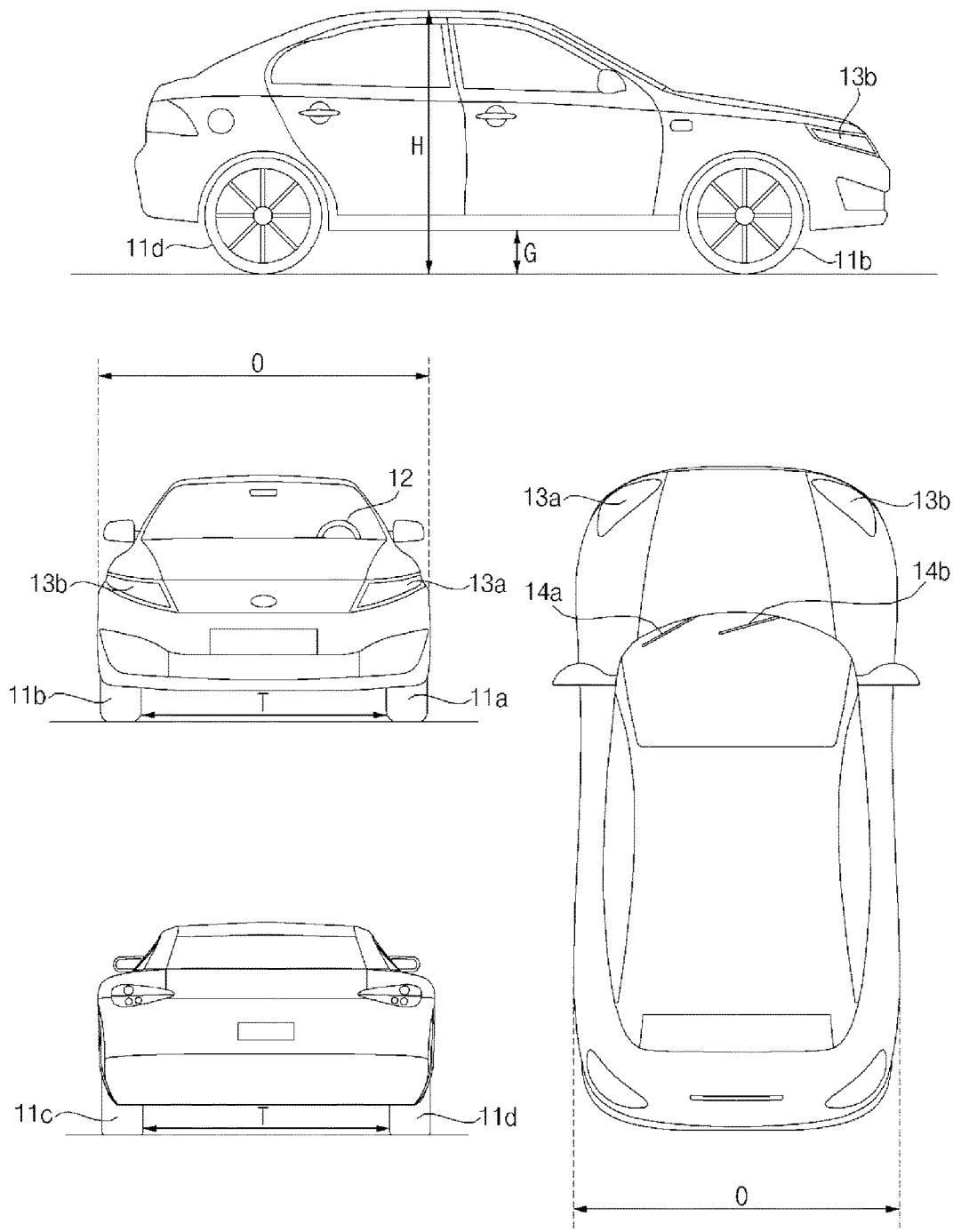
FIG. 2 illustrates the exterior of a four-wheeled vehicle according to an embodiment of the present invention.

FIG. 2 illustrates the exterior of the vehicle 100 according to an embodiment of the present invention. For the convenience of description, it is assumed that the vehicle 100 is a four-wheeled vehicle.

Referring to FIG. 2, the vehicle 100 includes tires 11a to 11d rotated by a power source, a steering wheel 12 for controlling the traveling direction of the vehicle 100, head lamps 13a and 13b, and the wipers 14a and 14b.

According to an embodiment of the present invention, the controller 170 of the vehicle 100 can generate an image of the surroundings of the vehicle 100, detect information from the generated image of the surroundings, and output a control signal for execution of an operation related to the vehicle 100 to the driving unit 150 based on the detected information. For example, the controller 170 can control the steering device or the like by a control signal.

In addition, an overall height H refers to a length from a grounding surface to a highest spot of the vehicle 100. The overall height H may be changed within a predetermined range according to the weight or position of a passenger or loaded goods. Also, a lowest spot of the body of the vehicle 100 may be apart from a road surface by a ground clearance G. Accordingly, an object having a lower height than the ground clearance G may be prevented from damaging the body of the vehicle 100.

It is assumed that the distance between the left and right front tires 11a and 11b is equal to the distance between the left and right rear tires 11c and 11d. Hereinbelow, it is assumed that the distance T between the inner surfaces of the left and right front tires 11a and 11b is equal to the distance T between the inner surfaces of the left and right rear tires 11c and 11d.

As illustrated, an overall width O of the vehicle 100 may be defined as a maximum distance between the leftmost and rightmost ends of the body of the vehicle 100 except for side mirrors (for example, folding power side mirrors).

Figure 3A:
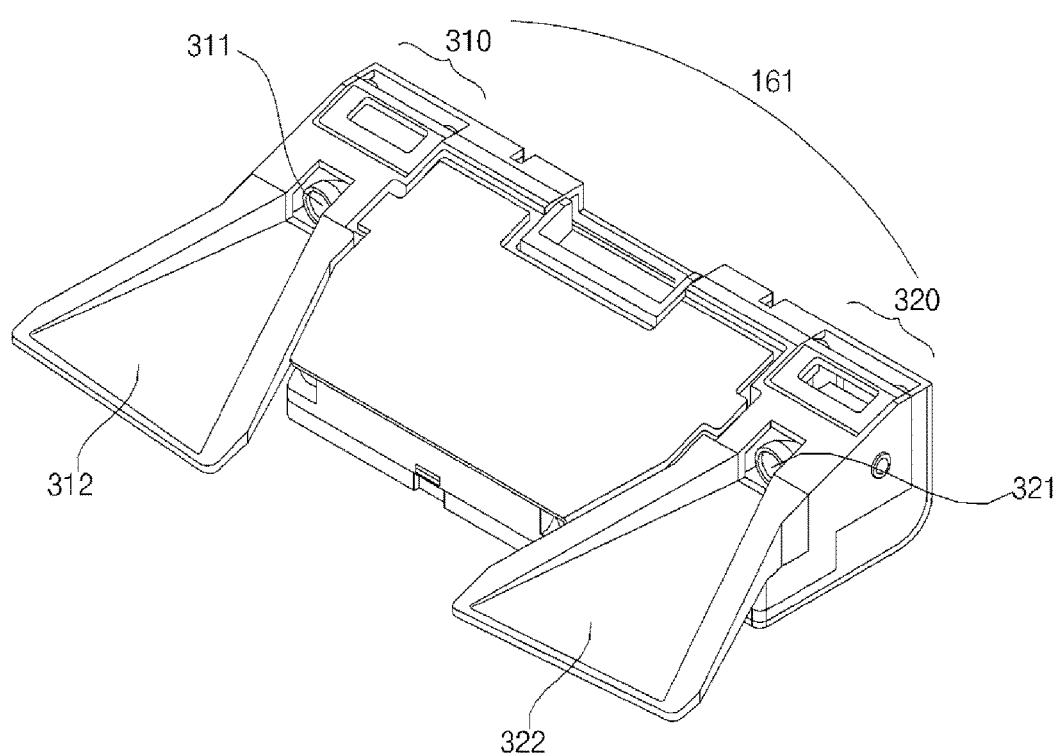
FIGS. 3A, 3B, and 3C are views referred illustrating external cameras depicted with reference to FIG. 1.

Next, FIG. 3A illustrates an example in which the camera 161 described before with reference to FIG. 1 is a stereo camera. Referring to FIG. 3A, the camera 161 may include a first camera 310 with a first lens 311 and a second camera 320 with a second lens 321. As the first and second lenses 311 and 312 are apart from each other by a predetermined distance, two different images of the same object may be acquired at a specific time point.

Also, the camera 161 may include a first light shield 312 and a second light shield 322 to shield light incident on the first lens 311 and the second lens 321. The camera 161 may be configured to be detachably attached to a ceiling or a windshield inside the vehicle 100.

The camera 161 may acquire stereo images of a view ahead of the vehicle 100. Disparity may be detected based on the stereo images, and at least one object (for example, a pedestrian, a traffic light, a road, a lane, or another vehicle) appearing in at least one stereo image may be detected based on disparity information. After an object is detected, movement of the object may be continuously tracked.

Figure 3B:
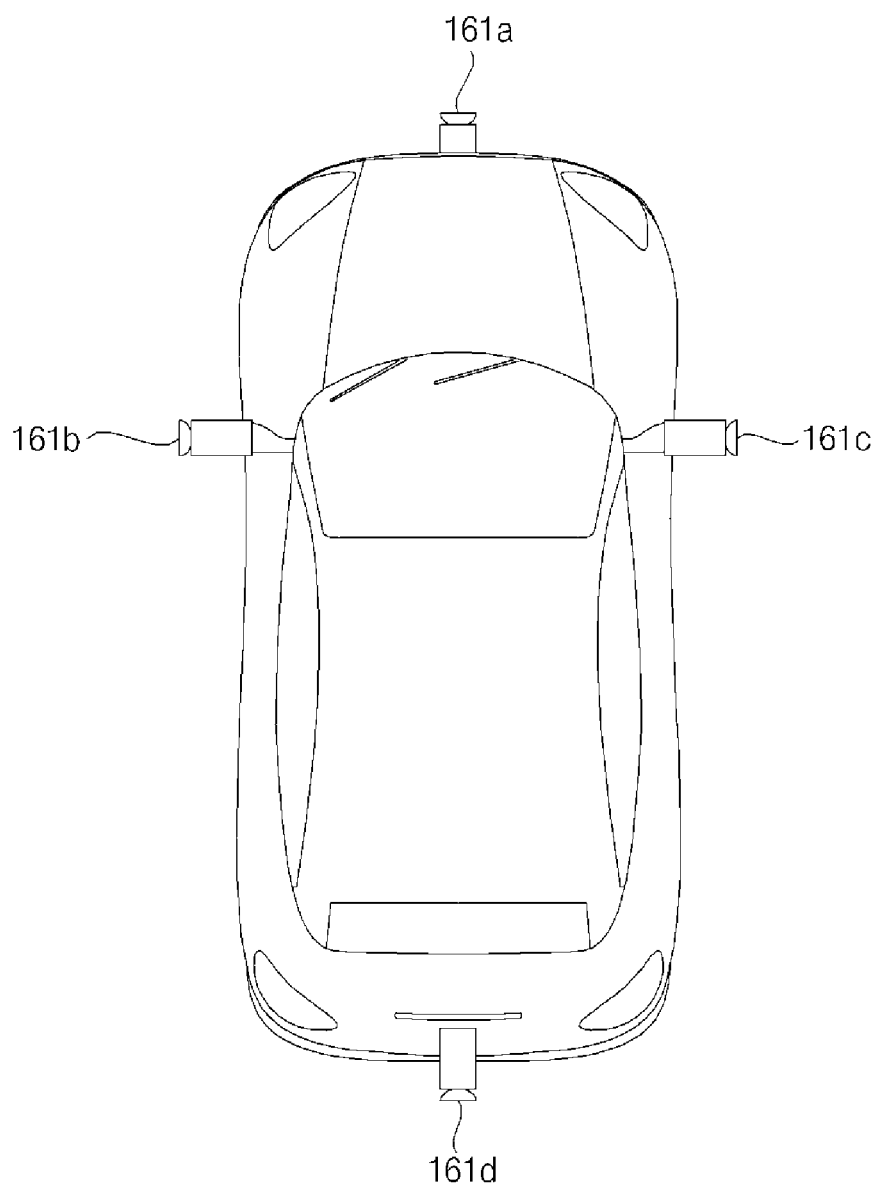
Figure 3C:
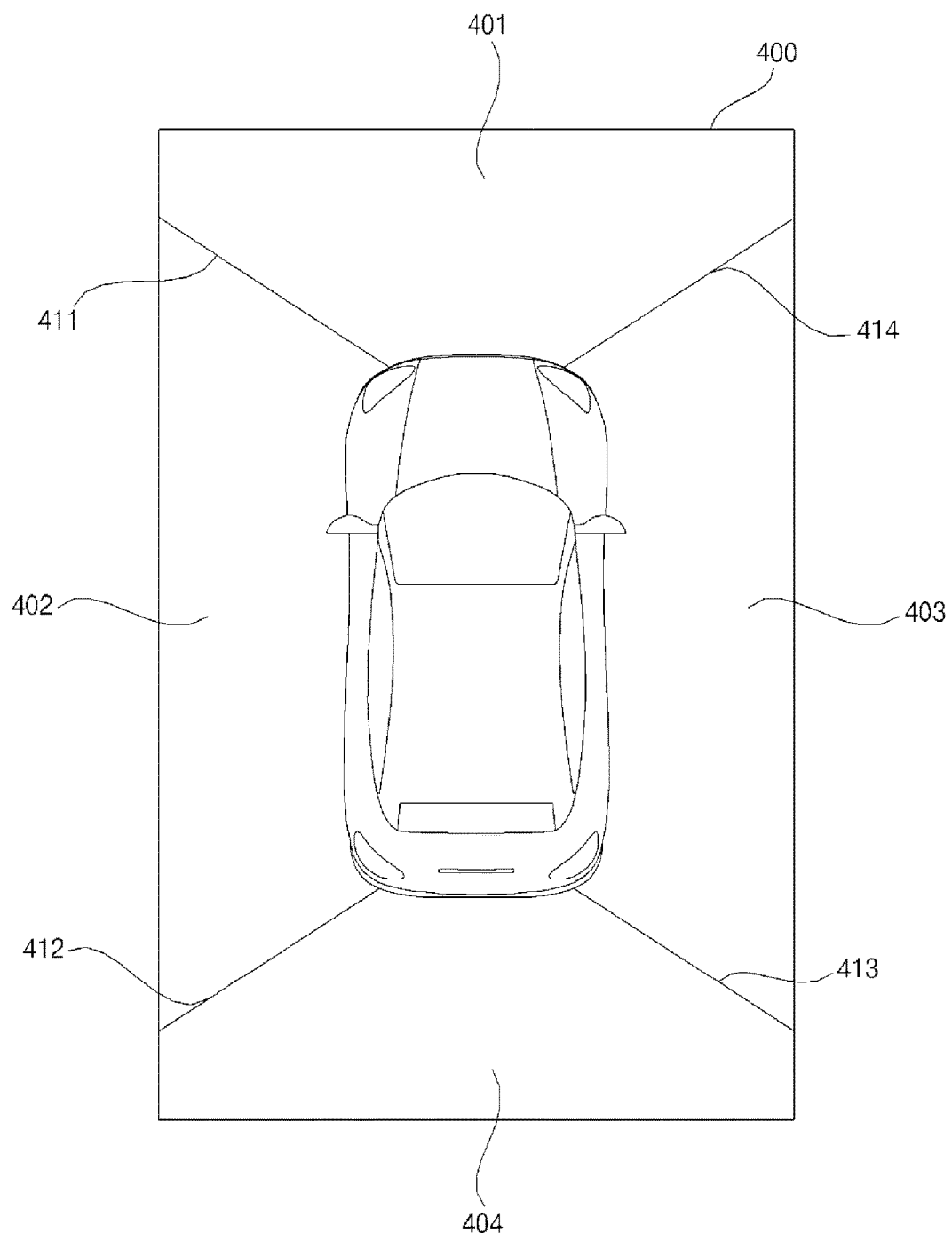

Referring to FIGS. 3B and 3C, four cameras 161a, 161b, 161c, and 161d may be installed at different positions on the exterior of the vehicle 100. Each of the four cameras 161a, 161b, 161c, and 161d is identical to the afore-described camera 161.

Referring to FIG. 3B, the plurality of cameras 161a, 161b, 161c, an 161d may be arranged at the front side, left side, right side, and rear side of the vehicle 100, respectively. Each of the cameras 161a, 161b, 161c, and 161d may be included in the camera 161 illustrated in FIG. 1.

The front camera 161a may be disposed in the vicinity of the windshield, an emblem, or a radiator grill. The left camera 161b may be disposed inside or outside a case surrounding a left side mirror. Or the left camera 161b may be disposed in an area of the exterior of a left front door, a left rear door, or a left fender.

The right camera 161c may be disposed inside or outside a case surrounding a right side mirror. Or the right camera 161b may be disposed in an area of the exterior of a right front door, a right rear door, or a right fender. The rear camera 161d may be disposed in the vicinity of a back number plate or a trunk switch.

Each image captured by the plurality of cameras 161a, 161b, 161c, and 161d may be provided to the controller 170, and the controller 170 can generate an image of the surroundings of the vehicle 100 by synthesizing the images.

While FIG. 3B illustrates attachment of four cameras onto the exterior of the vehicle 100, the present invention is not limited to the number of cameras. Thus, more or fewer cameras may be installed at different positions from the positions illustrated in FIG. 3B.

Referring to FIG. 3C, a synthetic image 400 may include a first image area 401 corresponding to an outside image captured by the front camera 161a, a second image area 402 corresponding to an outside image captured by the left camera 161b, a third image area 403 corresponding to an outside image captured by the right camera 161c, and a fourth image area 404 corresponding to an outside image captured by the rear camera 161d. The synthetic image 400 may be called an Around View Monitoring (AVM) image.

In addition, when the synthetic image 400 is generated, each of boundaries 411, 412, 413, and 414 is generated between every pair of outside images included in the synthetic image 400. These boundary parts may be naturally represented by image blending.

The boundaries 411, 412, 413, and 414 may be drawn between a plurality of images. Also, a predetermined image representing the vehicle 100 may be included at the center of the synthetic image 400. The synthetic image 400 may be displayed on a display installed inside the vehicle 100.

Figure 4:
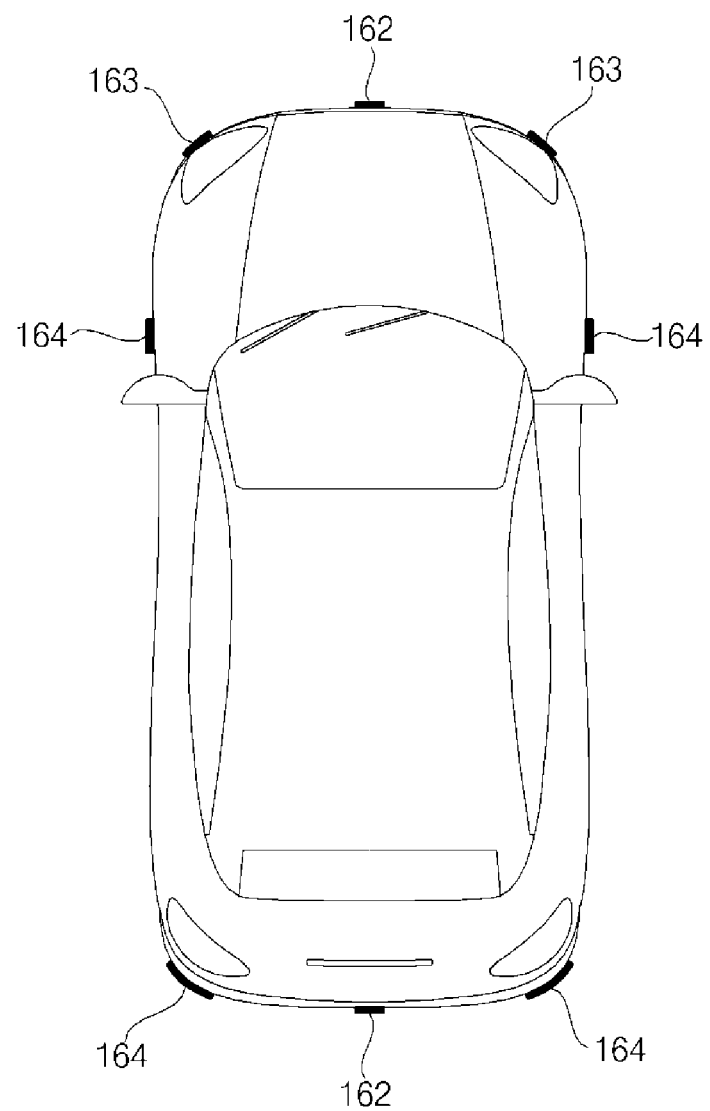
FIG. 4 illustrates an example of the vehicle illustrated in FIG. 1.

FIG. 4 illustrates an example of the vehicle 100 described before with reference to FIG. 1. Again, for the convenience of description, the vehicle 100 is assumed to be a four-wheeled vehicle.

Referring to FIGS. 1 and 4, the vehicle 400 may include at least one radar 162, at least one LiDAR 163, and at least one ultrasonic sensor 164. The radar 162 may be installed at a portion of the vehicle 100, radiate electromagnetic waves around the vehicle 100, and receive electronic waves reflected from various objects around the vehicle 100.

For example, the radar 162 may acquire information about a distance to an object, the heading of the object, the altitude of the object, and the like by measuring a time taken for electronic waves to be reflected and returned from the object.

The LiDAR 163 may be installed at a portion of the vehicle 100 and project a laser beam around the vehicle 100. The laser beam projected from the LiDAR 163 may be scattered or reflected and returned. The LiDAR 163 may acquire information about physical properties of a target around the vehicle 100, such as a distance to the target, the speed of the target, or the shape of the target based on a time of return, intensity, frequency change, and polarization change of the laser beam.

The ultrasonic sensor 164 may be installed at a portion of the vehicle 100 and generates ultrasonic waves around the vehicle 100. The ultrasonic waves generated by the ultrasonic sensor 164 are characterized by a high frequency (about 20 KHz or higher) and a short wavelength. The ultrasonic sensor 164 may be used mainly to recognize an obstacle or the like in the vicinity of the vehicle 100.

The at least one radar 162, the at least one LiDAR 163, and the at least one ultrasonic wave sensor 164 illustrated in FIG. 4 may be sensors included in the sensing unit 160 illustrated in FIG. 1. Also, it is obvious to those skilled in the art that different numbers of radars 162, LiDARs 163, and ultrasonic sensors 164 from those illustrated in FIG. 4 may be installed at different positions from those illustrated in FIG. 4 according to an embodiment.

Figure 5:
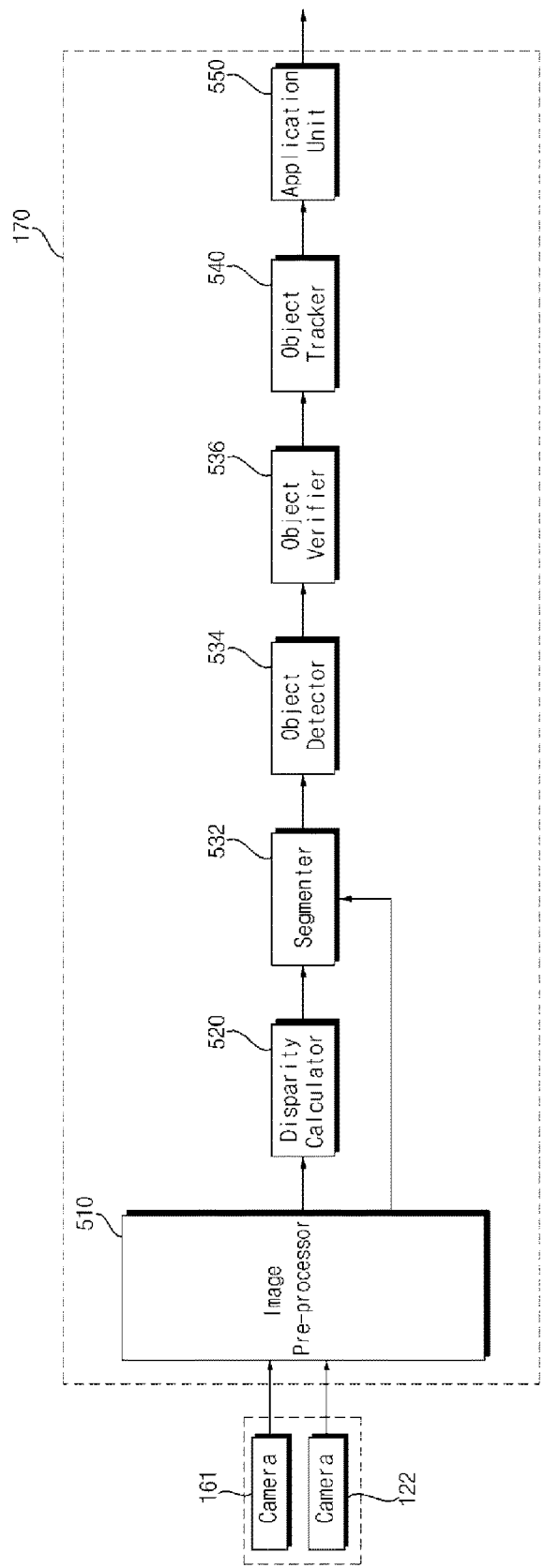
FIG. 5 is an exemplary interior block diagram of a controller illustrated in FIG. 1.

Next, FIG. 5 is an interior block diagram of the controller 170 illustrated in FIG. 1. Referring to FIG. 5, the controller 170 includes an image pre-processor 510, a disparity calculator 520, a segmenter 532, an object detector 534, an object verifier 536, an object tracker 540, and an application unit 550.

The image pre-processor 510 can receive images from the cameras 161 and 122 illustrated in FIG. 1 and pre-process the received images. Specifically, the image pre-processor 510 can subject an image to noise reduction, rectification, calibration, color enhancement, Color Space Conversion (CSC), interpolation, camera gain control, and the like. As a consequence, clearer images than stereo images captured by the cameras 161 and 122 may be acquired.

The disparity calculator 520 can receive the signal-processed images from the pre-processor 510, performs stereo matching on the received images, and acquire a disparity map according to the stereo matching. That is, the disparity calculator 520 can acquire disparity information about stereo images of a view ahead of the vehicle 100.

The stereo matching can be performed on the stereo images in units of a pixel or a predetermined block. In addition, the disparity map corresponds to a map representing binocular parallax information of stereo images, that is, left and right images as numerical values.

The segmenter 532 can segment and cluster at least one of the images based on the disparity information received from the disparity calculator 520. Specifically, the segmenter 532 can separate a background from a foreground in at least one of the stereo images based on the disparity information.

For example, the segmenter 532 can determine an area having disparity information equal to or smaller than a predetermined value in the disparity map to be the background and exclude the area. Therefore, the foreground can be separated relatively.

In another example, the segmenter 532 can determine an area having disparity information equal to or larger than a predetermined value in the disparity map to be the foreground and extract the area. Therefore, the foreground can be separated.

Since a foreground and a background are separated from each other using disparity information extracted based on stereo images in the above manner, a signal processing speed, the amount of a processed signal, and the like can be reduced during later object detection.

The object detector 534 can detect an object based on an image segment received from the segmenter 532. That is, the object detector 534 can detect an object from at least one image based on the disparity information.

Specifically, the object detector 534 can detect an object from at least one image. For example, the object detector 534 can detect an object in the foreground separated by an image segment.

The object verifier 536 can classify the separated object and verify the object. For this purpose, the object verifier 536 can use a neural network-based verification scheme, a Support Vector Machine (SVM) scheme, a Haar-like based AdaBoost verification scheme, a Histograms of Oriented Gradients (HOG) scheme, or the like.

In addition, the object verifier 536 can verify the object by comparing the detected object with objects stored in the memory 130. For example, the object verifier 536 can verify adjacent vehicles, lanes, a road surface, a sign board, a dangerous region, a tunnel, and the like in the vicinity of the vehicle.

The object tracker 540 tracks the verified object. For example, the object tracker 540 can verify an object in sequentially acquired images, calculate a motion or motion vector of the verified object, and track movement of the object based on the calculated motion or motion vector. Accordingly, the adjacent vehicles, lanes, the road surface, the sign board, the dangerous region, the tunnel, and the like in the vicinity of the vehicle may be tracked.

The application unit 550 can calculate a risk of the vehicle 100 based on various objects around the vehicle, for example, other vehicles, lanes, a road surface, or a sign board. Further, the application unit 550 can calculate a probability of rear-ending a preceding vehicle and determine whether the vehicle slips.

The application unit 550 can output a message or the like to provide information about the calculation and determination based on the calculated risk and rear-end collision possibility, or the determination made as to whether the vehicle slips. Or the application unit 550 can generate, as vehicle control information, a control signal for posture control or traveling control.

According to an embodiment, the controller 170 can include only a part of the image pre-processor 510, the disparity calculator 520, the segmenter 532, the object detector 534, the object verifier 536, the object tracker 540, and the application unit 550. For example, if the cameras 161 and 122 provide only a 2D image, the disparity calculator 520 may not be included.

Figure 6A:
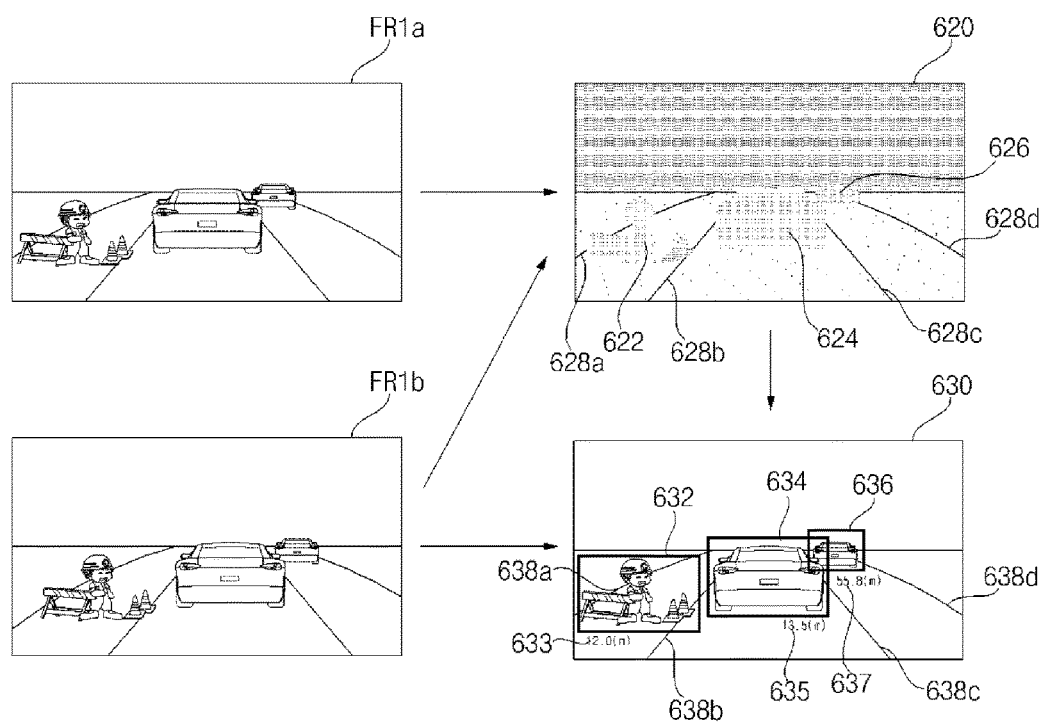
FIGS. 6A and 6B are views referred to illustrating an operation of the controller illustrated in FIG. 5.
Figure 6B:
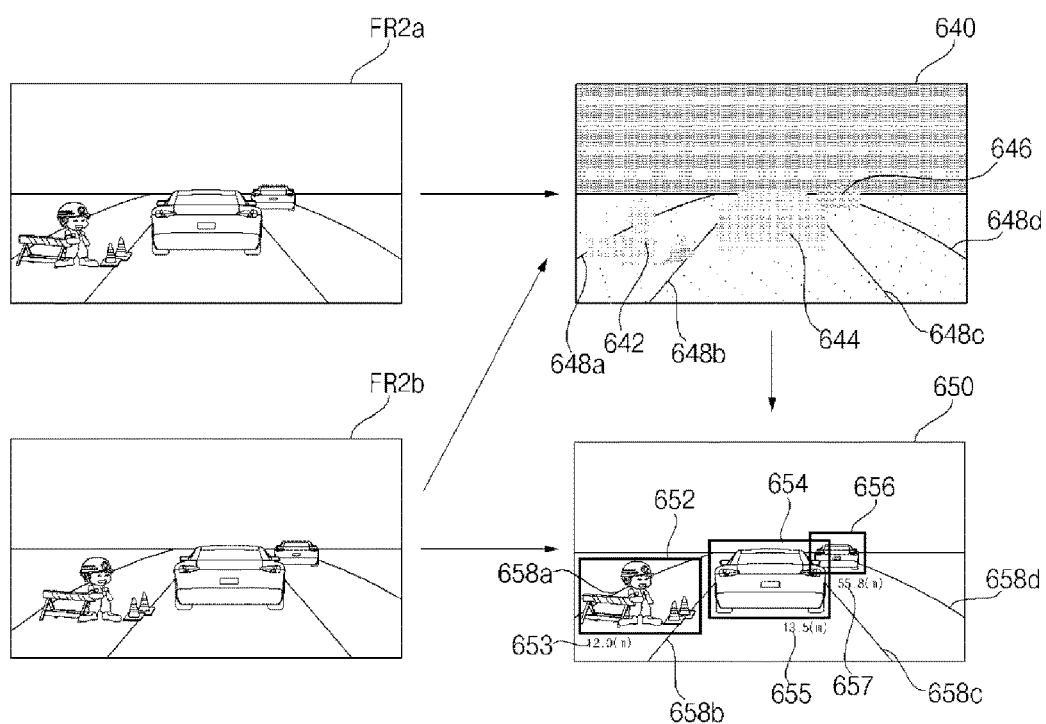

Next, FIGS. 6A and 6B are views referred to illustrating an operation of the controller 170 illustrated in FIG. 5. In particular, FIGS. 6A and 6B are views referred to illustrating an operation of the controller 170 illustrated in FIG. 5 based on stereo images acquired during first and second frame intervals.

Referring to FIG. 6A, if the camera 161 is a stereo camera, the camera 161 acquires stereo images during the first frame interval. The disparity calculator 520 of the controller 170 receives signal-processed stereo images FR1a and FR1b from the image pre-processor 510 and acquires a disparity map 620 by performing stereo matching on the stereo images FR1a and FR1b.

The disparity map 620 represents disparities between the stereo images FR1a and FR1b as levels. It may be determined that as a disparity level is higher, a distance to a vehicle is shorter, and as the disparity level is lower, the distance to the vehicle is longer.

When the disparity map 620 is displayed, luminosity may be higher for a higher disparity level and lower for a lower disparity level on the disparity map 620. In FIG. 6A, first to fourth lanes 628a, 628b, 628c, and 628d have their corresponding disparity levels, and a construction site 622, a first preceding vehicle 624, and a second preceding vehicle 626 have their corresponding disparity levels on the disparity map 620, by way of example.

The segmenter 532, the object detector 534, and the object verifier 536 perform segmentation, object detection, and object verification on at least one of the stereo images FR1a and FR1b based on the disparity map 620.

In FIG. 6A, object detection and object verification are performed on the second stereo image FR1b using the disparity map 620, by way of example. That is, first to fourth lanes 638a, 638b, 638c, and 638d, a construction site 632, a first preceding vehicle 634, and a second preceding vehicle 636 may be detected as objects and verified in an image 630.

Referring to FIG. 6B, the camera 161 acquires stereo images during the second frame interval. The disparity calculator 520 of the controller 170 receives signal-processed stereo images FR2a and FR2b from the image pre-processor 510, and acquires a disparity map 640 by performing stereo matching on the stereo images FR2a and FR2b.

In FIG. 6B, first to fourth lanes 648a, 648b, 648c, and 648d have their corresponding disparity levels, and a construction site 642, a first preceding vehicle 644, and a second preceding vehicle 646 have their corresponding disparity levels on the disparity map 640, by way of example.

The segmenter 532, the object detector 534, and the object verifier 536 perform segmentation, object detection, and object verification on at least one of the stereo images FR2a and FR2b based on the disparity map 640.

In FIG. 6B, object detection and object verification are performed on the second stereo image FR2b using the disparity map 640, by way of example. That is, first to fourth lanes 658a, 658b, 658c, and 658d, a construction site 652, a first preceding vehicle 654, and a second preceding vehicle 656 may be detected as objects and verified in an image 650.

In addition, the object tracker 540 may track a verified object by comparing FIG. 6A with FIG. 6B. Specifically, the object tracker 540 may track movement of each object verified in FIGS. 6A and 6B or the like based on a motion or motion vector of the object. Accordingly, lanes, a construction site, a first preceding vehicle, a second preceding vehicle, and the like around the vehicle may be tracked.

Figure 7:
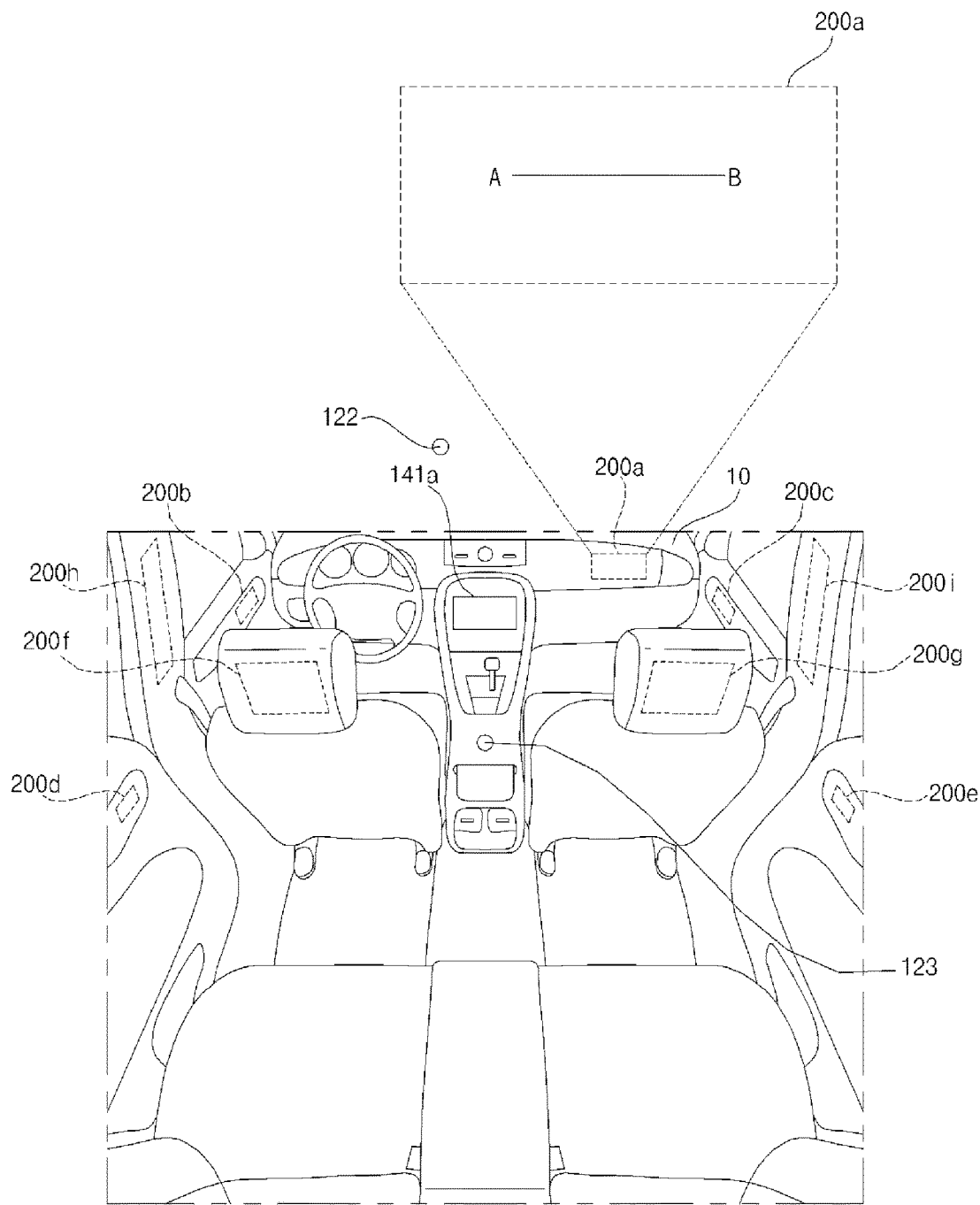
FIG. 7 illustrates an exemplary interior view of a vehicle according to an embodiment of the present invention.

FIG. 7 illustrates an exemplary interior view of the vehicle 100 according to an embodiment of the present invention. Referring to FIG. 7, a Center Information Display (CID) 141a and at least one display 200a to 200i may be included inside the vehicle 100. The CID 141a and the at least one display 200a to 200i may be included in the display unit 141 illustrated in FIG. 1. For the convenience of description, it is assumed that the vehicle 100 has four seats and four doors. Hereinafter, each of the displays 200a to 200i will be referred to as a hidden display.

For example, as illustrated in FIG. 7, the displays 200a to 200i may include a first hidden display 200a on a dashboard 10, second to fifth hidden displays 200b to 200e on the doors, sixth and seventh hidden displays 200f and 200g on the rear surfaces of the head rests of two front seats, and eighth and ninth hidden displays 200h and 200i on both B-pillars.

The controller 170 can be connected to the plurality of hidden displays 200a to 200i arranged inside the vehicle 100. Also, the controller 170 can control the hidden displays 200a to 200i at the same time or individually. The hidden displays 200a to 200i can perform a predetermined operation according to a control signal received from the controller 170. That is, the controller 170 can control an operation of each hidden display.

For example, the controller 170 can turn on one of the hidden displays 200a to 200i, while turning off the other hidden displays. In another example, the controller 170 can control the hidden displays 200a to 200i to display different information.

In addition, the input unit 120 including the internal camera 122 and the microphone 123 may be disposed inside the vehicle 100. The input unit 120 may include a plurality of physical buttons for on/off control of each of the hidden displays 200a to 200i.

As described before, the internal camera 122 may be disposed at a portion (for example, at a top end of the windshield) inside the vehicle 100. Further, the microphone 123 can receive a voice command from a passenger in the vehicle 100.

The controller 170 can determine the position of a user (that is, a passenger) based on images received from the internal camera 122. Obviously, if there are a plurality of persons in the vehicle 100, the controller 170 can individually determine the positions of the users.

Also, the controller 170 can identify a user appearing in images received from the internal camera 122, based on the images. That is, the controller 170 can determine who is a passenger in the vehicle 100 at present. For example, facial images of pre-registered users and personal information (for example, name, age, gender, height, phone number, and relation with a driver) related to each of the facial images may be pre-stored in the memory 130, and the controller 170 can extract a facial part from the images. Then, the controller 170 can acquire personal information about the user in the vehicle 100 at present by comparing the extracted facial part with the pre-stored facial images of the memory 130, and identify the user based on the acquired personal information.

Further, at least one weight sensor may be provided inside the vehicle 100. For example, a weight sensor may be provided at each of the four seats. Obviously, additional weight sensors may be disposed at other positions (for example, on a mat and in a trunk) inside the vehicle 100.

The controller 170 can display information corresponding to a weight measured by a weight sensor on at least one of the hidden displays 200a to 200i. For example, if a weight measured by a weight sensor exceeds a predetermined threshold, the controller 170 can display a predetermined alarm message on a hidden display nearest to a seat equipped with the weight sensor.

Figure 8:
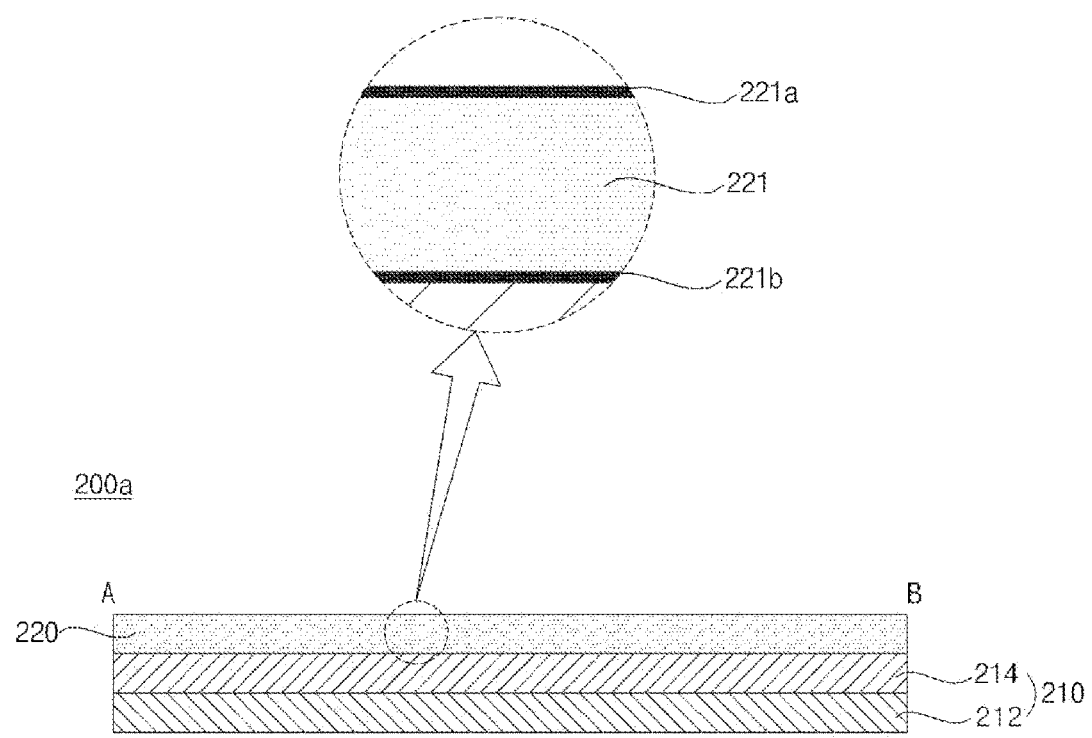
FIG. 8 illustrates an exemplary structure of a hidden display according to an embodiment of the present invention.

Next, FIG. 8 illustrates a structure of a hidden display according to an embodiment of the present invention. For the convenience of description, the structure of a hidden display will be described with reference to a side sectional view of the first hidden display 200a illustrated in FIG. 7, taken along line A-B.

Referring to FIG. 8, the first hidden display 200a includes a touch screen 210 and a cover 220. The touch screen 210 may include a display panel 212 and a touch panel 214. As illustrated in FIG. 8, the touch panel 214 may be stacked on and combined with the display panel 212.

Also, the cover 220 may be placed on the top surface of the touch screen 210, that is, on top of the touch panel 214. Unlike the structure illustrated in FIG. 8, tempered glass may be interposed between the touch screen 210 and the cover 220, in order to protect the touch screen 210 from an external impact.

The cover 220 has a predetermined light transmittance. For example, the light transmittance of the cover 220 may range from 10% to 20%. Accordingly, information displayed on the touch screen 210 can be provided to the user through the cover 220. Further, the cover 220 may have the same color as an interior part having the first hidden display 200a in the vehicle 100. For example, if the first hidden display 200a is disposed on a part of the dashboard 10, the cover 220 may be fabricated in the same color as the dashboard 10.

Therefore, when the first hidden display 200a is turned off, that is, the display panel 212 is turned off, the user does not readily view the first hidden display 200a. That is, when no information is output on the first hidden display 200a, the first hidden display 200a is not noticeable, which renders the interior of the vehicle 100 to be relatively simple.

If the touch screen 210 is a capacitive type, the cover 220 may be formed of a conductive material. If the cover 220 is formed of a conductive material, the touch screen 210 may sense a capacitance change caused by a touch on the cover 220 made by the user's finger or the like. It is apparent that if the touch screen 210 is a resistive type, the cover 220 may not be formed of a conductive material.

The cover 220 may include a base layer 221, a first coating layer 221a, and a second coating layer 221b. The base layer 221 may be formed of a material such as electroconductive plastic. Also, the base layer 221 may be formed by calendaring. Calendaring is a process of molding a sheet by rolling thermoplastic resin between two heated rollers. The light transmittance and tensile strength of the base layer 221 may be determined by a surface condition (for example, temperature) of the two heated rollers.

The first coating layer 221a and the second coating layer 221b may be combined with the top and bottom surfaces of the base layer 221, respectively, thereby protecting the base layer 221. The first coating layer 221a and the second coating layer 221b may be combined with the base layer 221 by a Gravure coating process.

While FIG. 8 has been described above in the context of the first hidden display 200a illustrated in FIG. 7, it is clear to those skilled in the art that the other hidden displays may also be configured in the same structure as the first hidden display 200a. It is to be clearly understood that the size and shape of one hidden display may be different from the size and shape of another hidden display.

Figure 9:
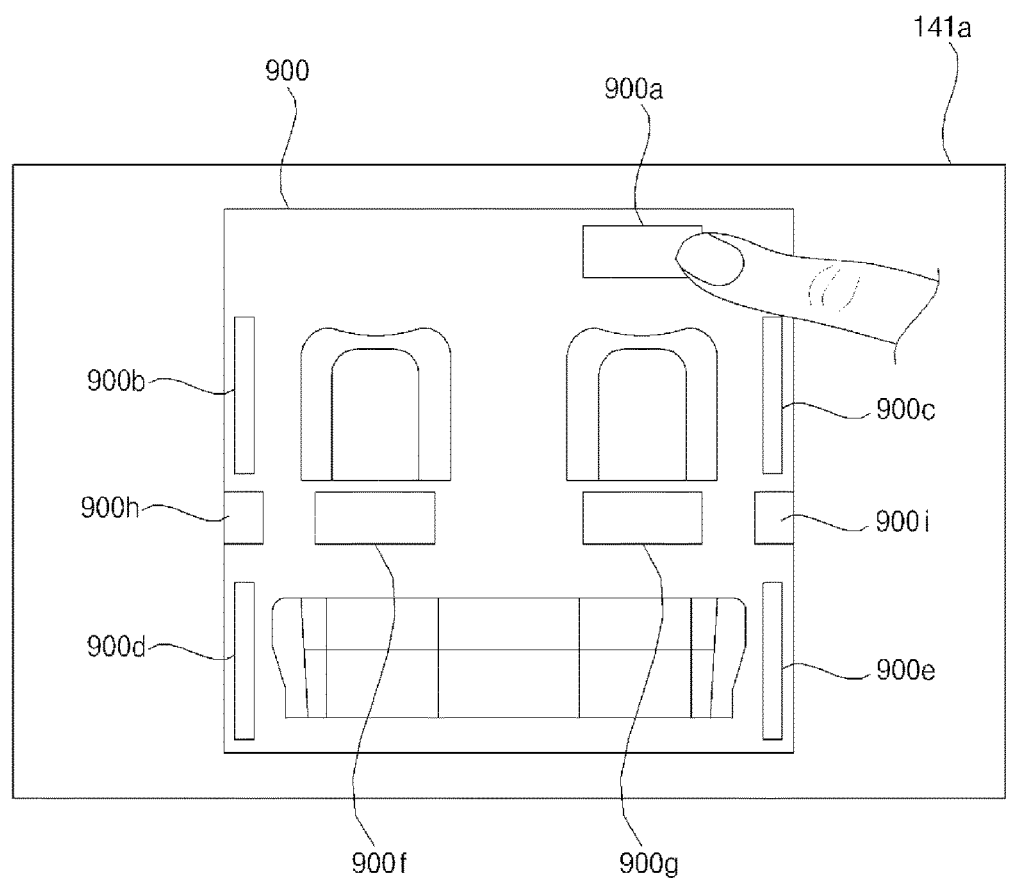
FIG. 9 illustrates an exemplary user interface for receiving a turn-on command and a turn-off command for a plurality of hidden displays illustrated in FIG. 7.

Next, FIG. 9 illustrates a User Interface (UI) 900 for receiving a turn-on command and a turn-off command for the plurality of hidden displays 200a to 200i illustrated in FIG. 7. In particular, FIG. 9 illustrates when the UI 900 is displayed on the CID 141a illustrated in FIG. 7. The CID 141a may include a touch screen. However, this is purely exemplary and thus, the UI 900 may be displayed on a display included in the display unit 141, other than the CID 141a.

Referring to FIG. 9, the UI 900 provides a plurality of selectable graphic buttons 900a to 900i, for receiving an on/off command for each of the hidden displays 200a to 200i arranged inside the vehicle 100. In particular, the graphic buttons 900a to 900i interwork with the hidden displays 200a to 200i which, in this sequential order, correspond to the graphic buttons 900a to 900i.

In this instance, the controller 170 can change the color of the graphic buttons 900a to 900i according to the on/off states of the hidden displays 200a to 200i. For example, if some hidden displays 200b, 200f, and 200g are off at present, the graphic buttons 900b, 900f, and 900g interworking with the hidden displays 200b, 200f, and 200g can be displayed in a first color (for example, red), and the remaining graphic buttons 900a, 900c to 900e, and 900h to 900i can be displayed in a second color (for example, blue). Therefore, the user can readily recognize which hidden displays are currently on and off among the hidden displays 200a to 200i.

Also, upon receipt of touch inputs for the graphic buttons 900a to 900i, the controller 170 can control the on/off of the hidden displays corresponding to the touch inputs. For example, when the user touches the graphic button 900a, the controller 170 can turn on the first hidden display 200a in response to the touch on the graphic button 900a. When the user touches the graphic button 900a again, the controller 170 can turn off the first hidden display 900a in response to the touch on the graphic button 900a.

Figure 10A:
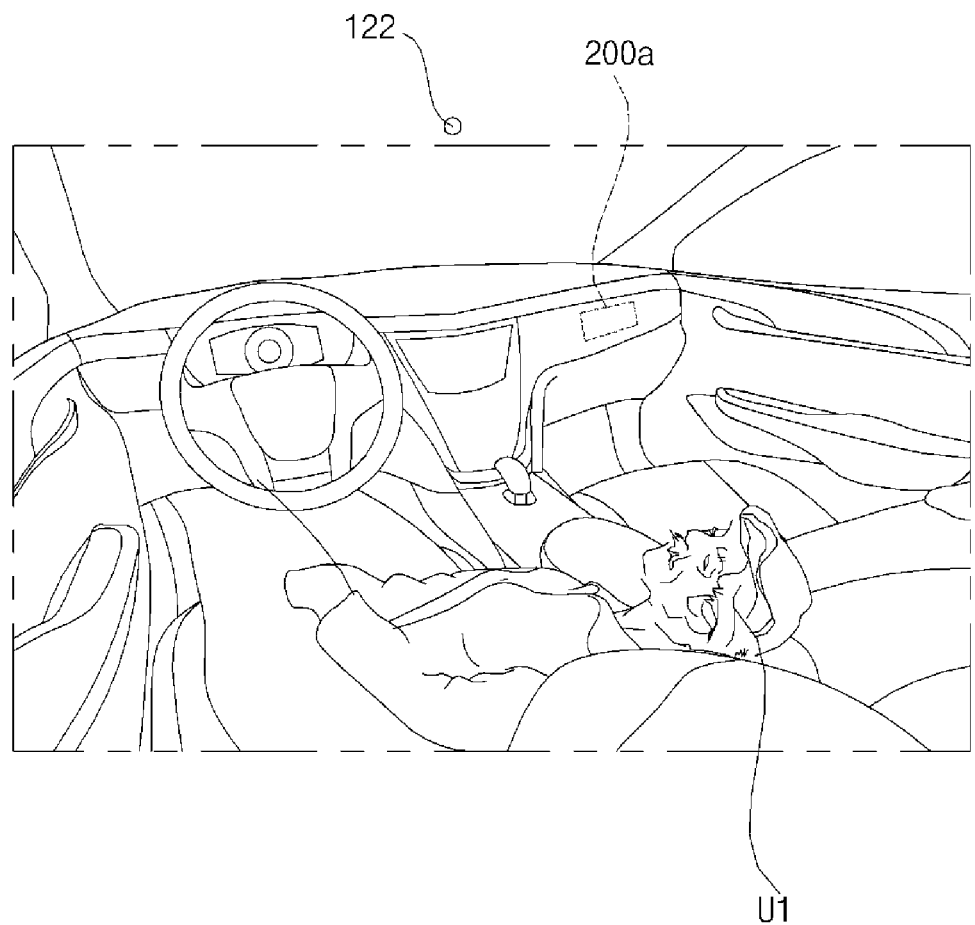
FIGS. 10A and 10B illustrate an exemplary operation for controlling the plurality of hidden displays illustrated in FIG. 7 in a vehicle according to an embodiment of the present invention.
Figure 10B:
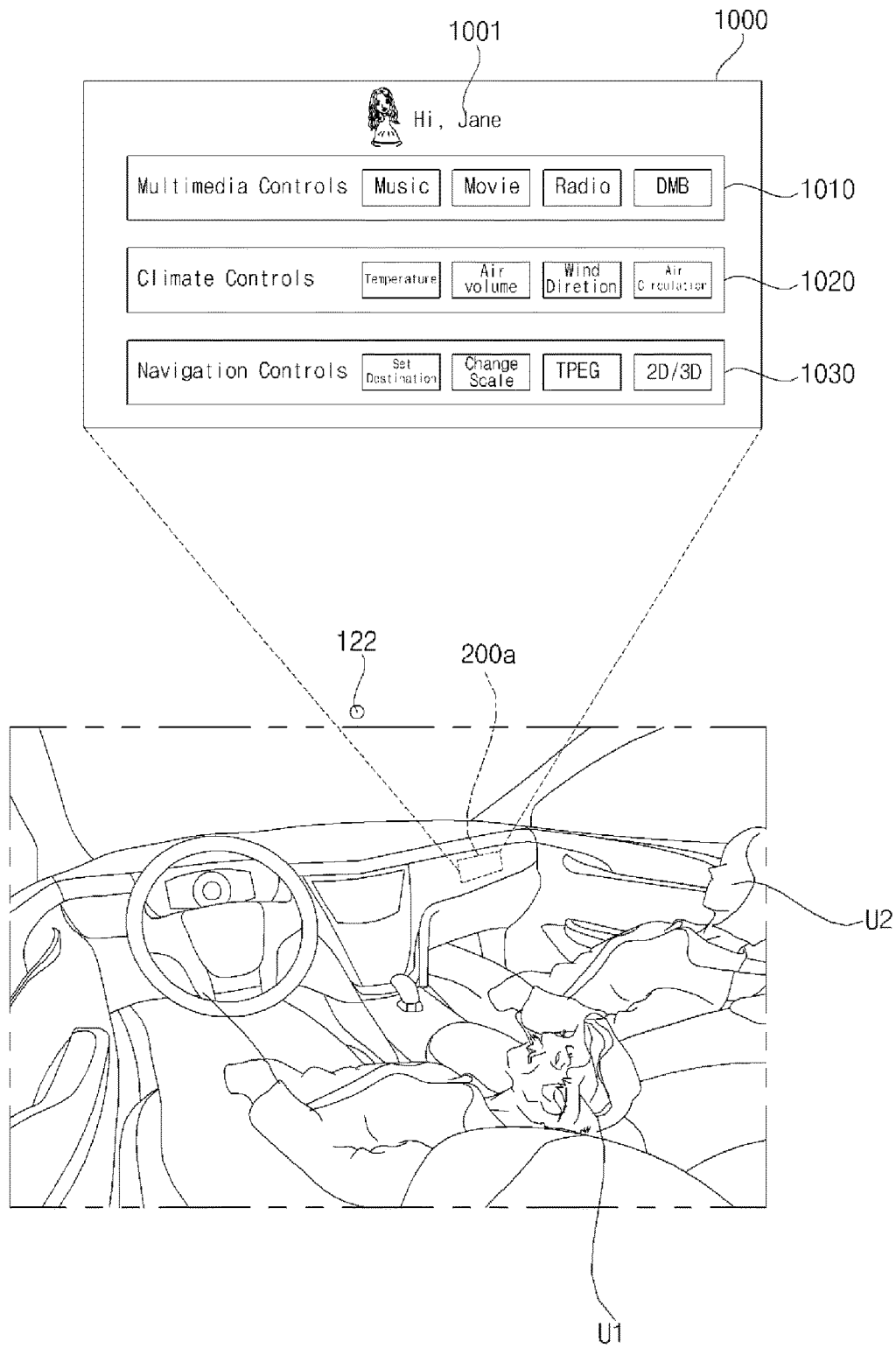

Next, FIGS. 10A and 10B illustrate an operation for controlling the plurality of hidden displays 200a to 200i illustrated in FIG. 7 in the vehicle 100 according to an embodiment of the present invention. In the illustrated case of FIG. 10A, a driver U1 is sitting in the driver's seat with no passenger in the passenger seat to the right of the driver's seat.

Specifically, the controller 170 can determine the presence or absence of a user in the vehicle 100 based on images received from the internal camera 122. In the presence of a user in the vehicle 100, the controller 170 can determine the position of the user. For example, the controller 170 can determine a seat at which the specific user sits, from among a plurality of seats.

In addition, the controller 170 can control an operation of a specific display corresponding to the position of the user among the hidden displays 200a to 200i. For example, if the user sits in the passenger seat, the controller 170 can automatically turn on the first hidden display 200a on the dashboard among the hidden displays 200a to 200i.

If there is no passenger in the passenger seat as illustrated in FIG. 10A, the controller 170 can leave the first hidden display 200a off. Compared to FIG. 10A, FIG. 10B illustrates when a user U2 sits in the passenger seat in the vehicle 100.

Further, as discussed above, the controller 170 can determine that the user U2 is sitting in the passenger seat of the vehicle 100 by comparing images received from the internal camera 122, sequentially in time.

The controller 170 can automatically turn on the first hidden display 200a corresponding to the position of the user U2 in response to the sitting of the user U2 at the passenger seat of the vehicle 100. Also, the controller 170 can display a predetermined UI 1000 on the first hidden display 200a.

Also, the controller 170 can identify the user U2 by extracting a facial part of the user U2 in an image and comparing the extracted facial part with the facial images pre-stored in the memory 130. That is, the controller 170 can access the memory 130 and acquire personal information from the memory 130, based on images received from the internal camera 122.

For example, if the name of the user U2 is 'Jane', the controller 170 can display a message 1001 related to the user U2 (for example, "Hi, Jane") on the first hidden display 200a. Further, the controller 170 can display menus corresponding to functions available from the vehicle 100 on the first hidden display 200a. For example, the controller 170 can display, on the first hidden display 200a, the UI 1000 including a multimedia control menu 1010, an HVAC control menu 1020, and a navigation control menu 1030.

The controller 170 can also play multimedia such as music, a movie, a radio program, or a Digital Multimedia Broadcast (DMB) program according to a user input for the multimedia control menu 1010. The controller 170 can also control temperature, air volume, wind direction, air circulation, and the like according to a user input for the HVAC control menu 1020. The controller 170 can also set a destination, change the scale of an electronic map, collect traffic information, switch between 2D and 3D modes of the map, and the like according to a user input for the navigation control menu 1030.

In addition, the controller 170 can determine the position of the user U2 using a weight sensor instead of the internal camera 122. For example, if a weight measured by a weight sensor provided at the passenger seat is equal to or higher than a predetermined value (for example, 30 Kg), the controller 170 can determine that the user U2 is sitting in the passenger seat. In this instance, the first hidden display 200a may not display a message related to the user U2 such as "Hi, Jane".

Figure 11A:
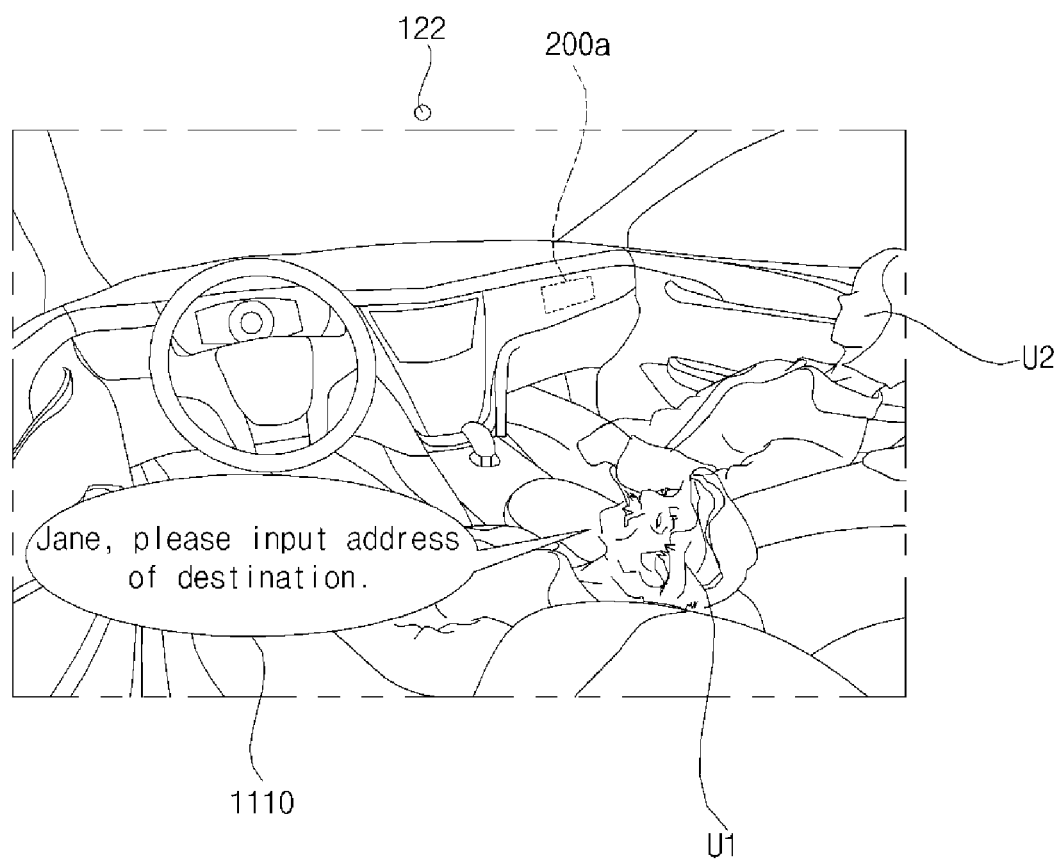
FIGS. 11A and 11B illustrate an exemplary operation for controlling the plurality of hidden displays illustrated in FIG. 7 in a vehicle according to an embodiment of the present invention.
Figure 11B:
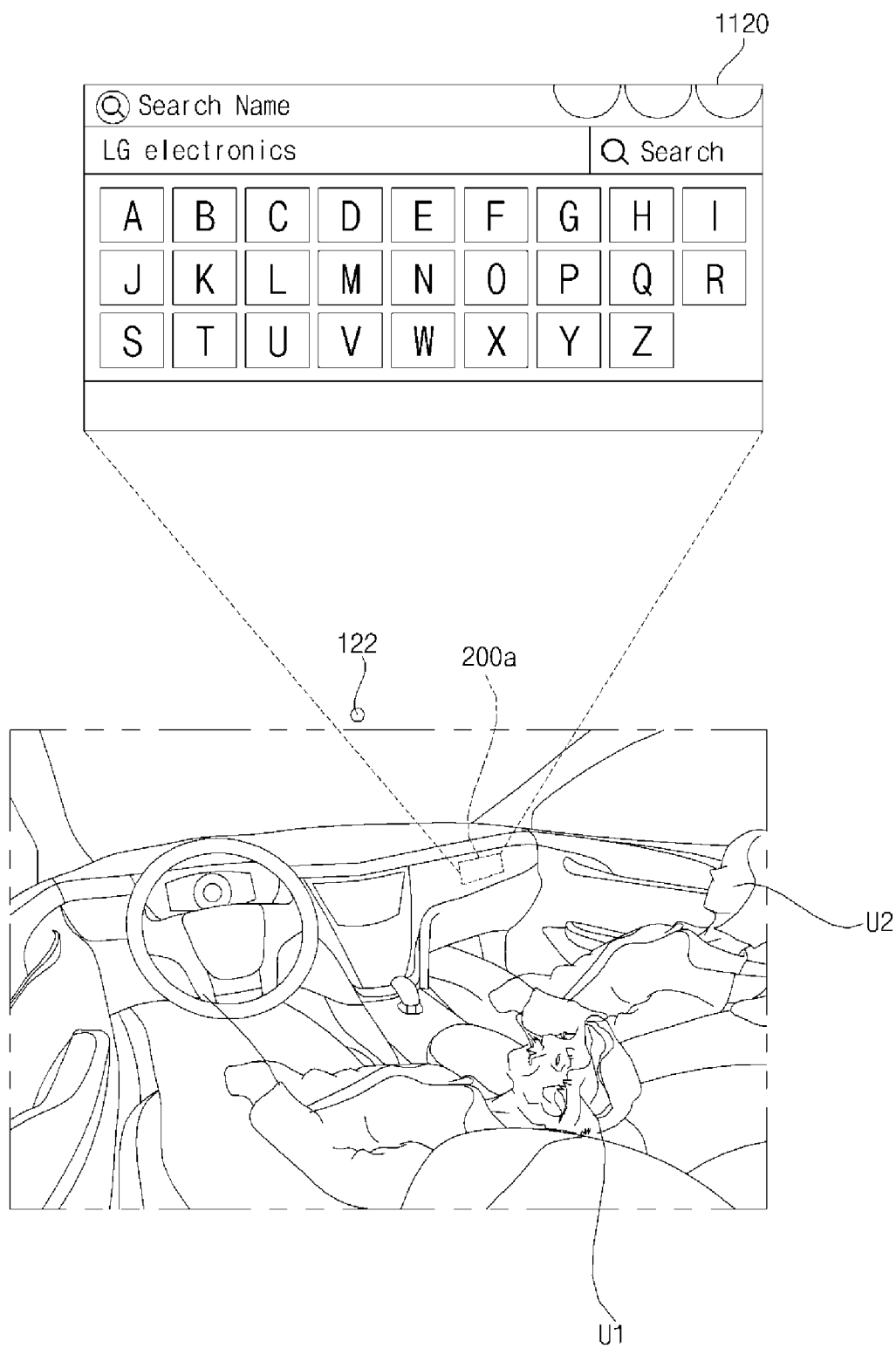

Next, FIGS. 11A and 11B illustrate an operation for controlling the plurality of hidden displays 200a to 200i illustrated in FIG. 7 in the vehicle 100 according to an embodiment of the present invention. The controller 170 can control an operation of at least one of the hidden displays 200a to 200i based on a voice command received from a passenger in the vehicle 100.

FIG. 11A illustrates when the driver U1 requests the user U2 sitting in the passenger seat to enter the address of a destination by voice 1110. The microphone 123 can convert the input voice 1110 to an electrical signal and provide the electrical signal to the controller 170.

The controller 170 can then control an operation of a specific hidden display corresponding to the voice 1110 among the hidden displays 200a to 200i based on the electrical signal received from the microphone 123.

FIG. 11B illustrates an operation of the controller 170 in response to the voice 1110. Referring to FIG. 11B, if the voice 1110 is a message "Jane, please input address of destination", the controller 170 determines the meaning of the contents of the voice 1110 by a voice recognition scheme and controls an operation of a specific hidden display according to the determined meaning. That is, the controller 170 can turn on the first hidden display 200a corresponding to the position of the user U2 based on 'Jane' included in the voice 1110.

Also, the controller 170 can display an input window 1120 for destination setting on the first hidden display 200a based on 'input address of destination' included in the voice 1110.

Figure 12A:
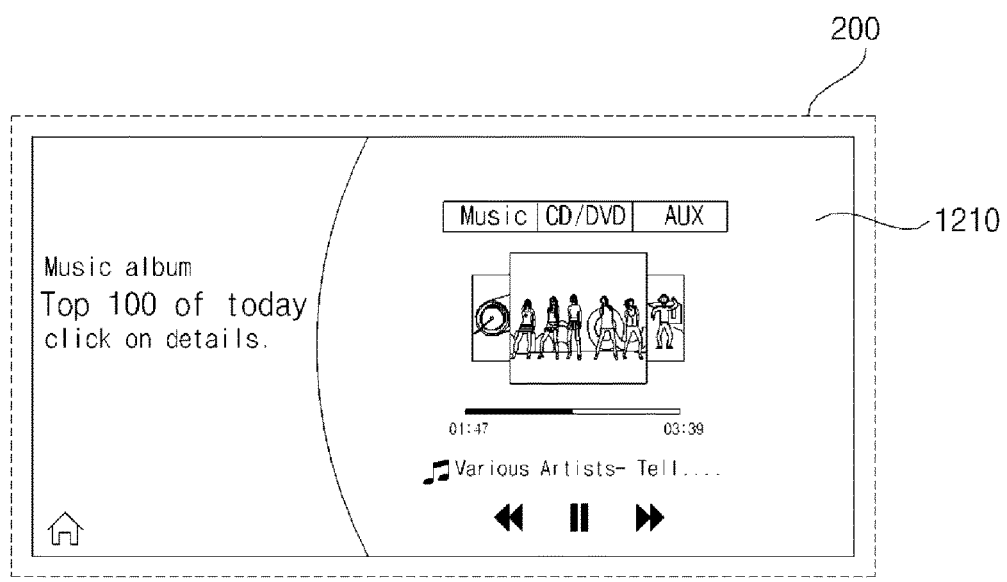
FIGS. 12A, 12B, and 12C illustrate various examples of information displayed on a hidden display in a vehicle according to an embodiment of the present invention.
Figure 12B:
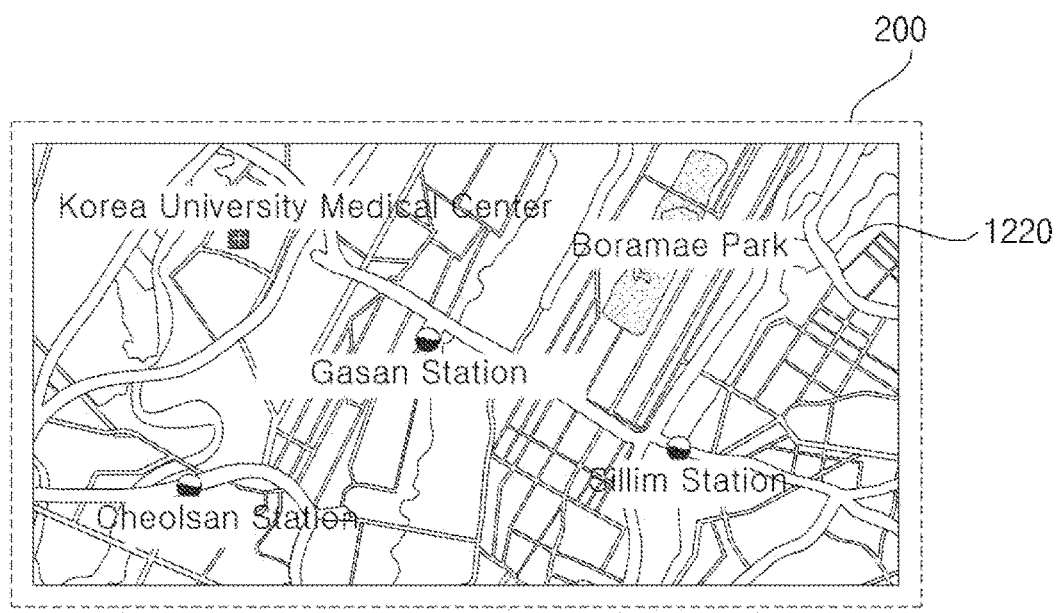
Figure 12C:
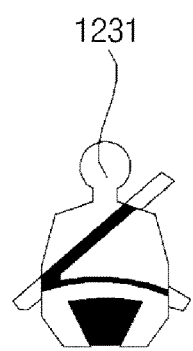
Figure 12C:
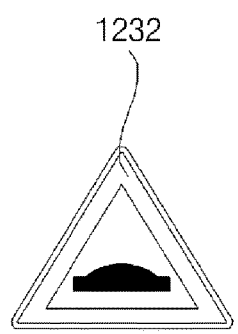
Figure 12C:
Figure 12C:
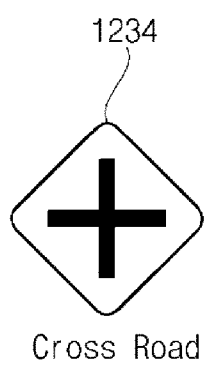
Figure 12C:
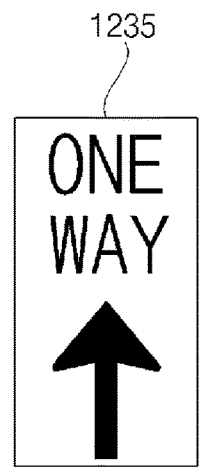

FIGS. 12A, 12B, and 12C illustrate various examples of information displayed on a hidden display in the vehicle 100 according to an embodiment of the present invention. In particular, FIG. 12A illustrates a music play screen 1210 displayed on a hidden display 200. For example, if a 'Music' icon is touched in the multimedia play menu 1010 illustrated in FIG. 10B, the controller 170 can display the music play screen 1210 by reproducing a predetermined music file.

FIG. 12B illustrates a route guiding screen 1220 displayed on the hidden display 200. For example, the controller 170 can display the route guiding screen 1220 on the hidden display 200 in response to a user input requesting route guidance.

FIG. 12C illustrates an example of various indicators 1231 to 1235 that may be displayed on the hidden display 200 in the vehicle 200. The controller 170 can change the alarm indicators 1231 to 1235 displayed on the hidden display 200 by traveling situation or by location.

For example, if there is a user not wearing a seat belt in the vehicle 100, the controller 170 can display the alarm indicator 1231 requesting fastening of a seat belt on at least one of the hidden displays 200a to 200i.

In another example, in the presence of a speed bump within a predetermined distance ahead of the vehicle 100, the controller 170 can display the alarm indicator 1232 indicating the presence of a speed bump on at least one of the hidden displays 200a to 200i.

In yet another example, in the presence of a school zone on a route of the vehicle 100, the controller 170 can display the alarm indicator 1233 indicating the presence of a school zone on at least one of the hidden displays 200a to 200i.

In still another example, in the presence of an intersection on the route of the vehicle 100, the controller 170 can display the alarm indicator 1234 indicating the presence of an intersection on at least one of the hidden displays 200a to 200i.

In another example, if a road on which the vehicle 100 is riding is a one-way road, the controller 170 can display the alarm indicator 1235 indicating that the vehicle 100 is riding on a one-way road on at least one of the hidden displays 200a to 200i. In this instance, the controller 170 can preliminarily determine whether there is a speed bump, a school zone, an intersection, or the like on the route of the vehicle 100 based on map information.

In addition, the controller 170 can control the screen brightness of each of at least one hidden display according to the type of information displayed on the hidden display. In particular, in one embodiment, the controller 170 can display information related to passenger safety in the vehicle 100 at a first brightness level and information not related to passenger safety at a second brightness level. For example, the alarm indicator 1231 illustrated in FIG. 12C can be displayed at the first brightness level, and the music play screen 1210 illustrated in FIG. 12A can be displayed at the second brightness level.

In addition, the various types of information illustrated in FIGS. 12A, 12B, and 12C can be displayed on different hidden displays. That is, the controller 170 can display information different from information displayed on one hidden display on another hidden display. For example, the music play screen 1210 illustrated in FIG. 12A can be displayed on the sixth hidden display 200f, whereas the route guiding screen 1220 illustrated in FIG. 12B can be displayed on the seventh hidden display 200g.

Figure 13A:
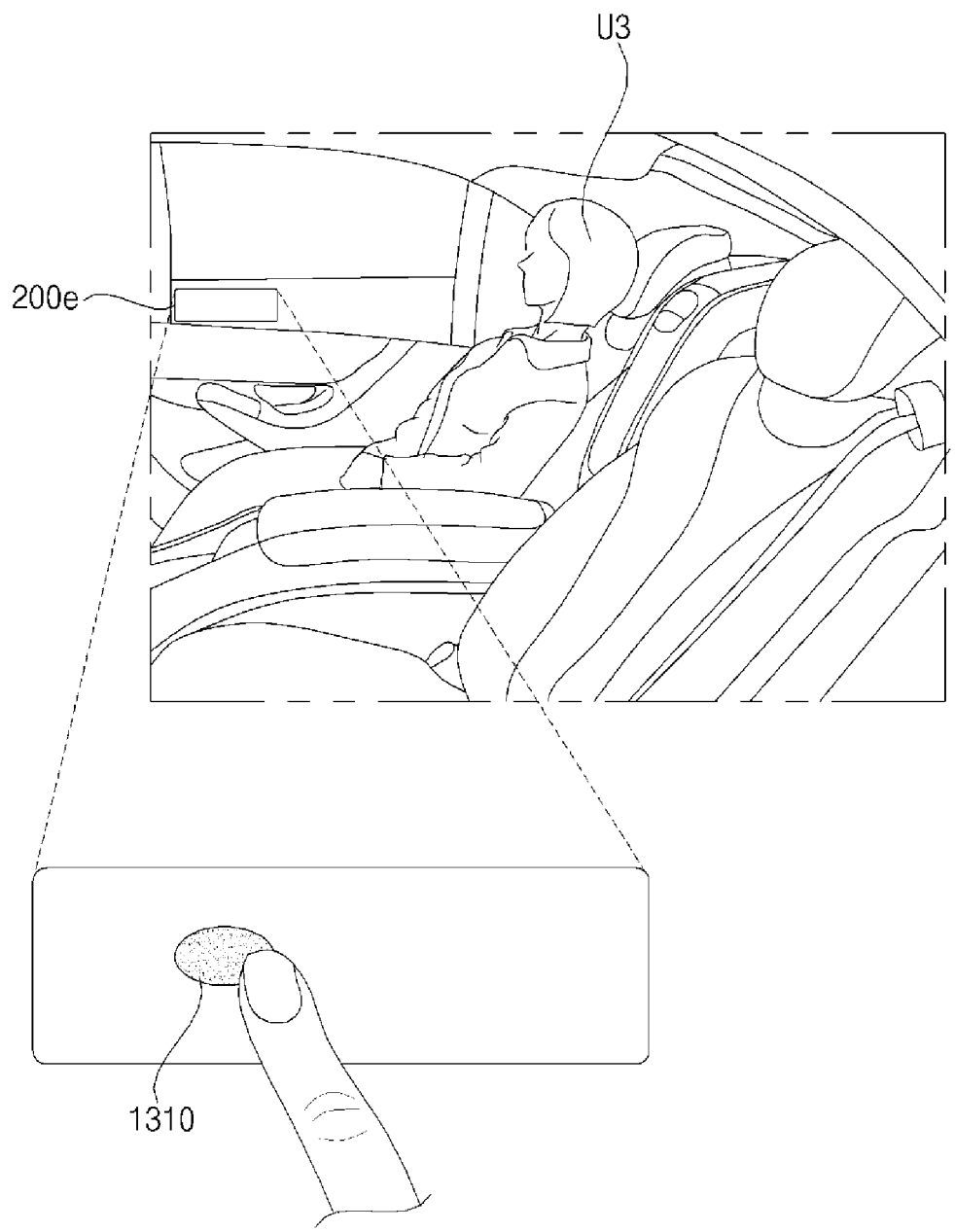
FIGS. 13A and 13B illustrate exemplary control of an operation of a hidden display provided on a door in a vehicle according to an embodiment of the present invention.
Figure 13B:
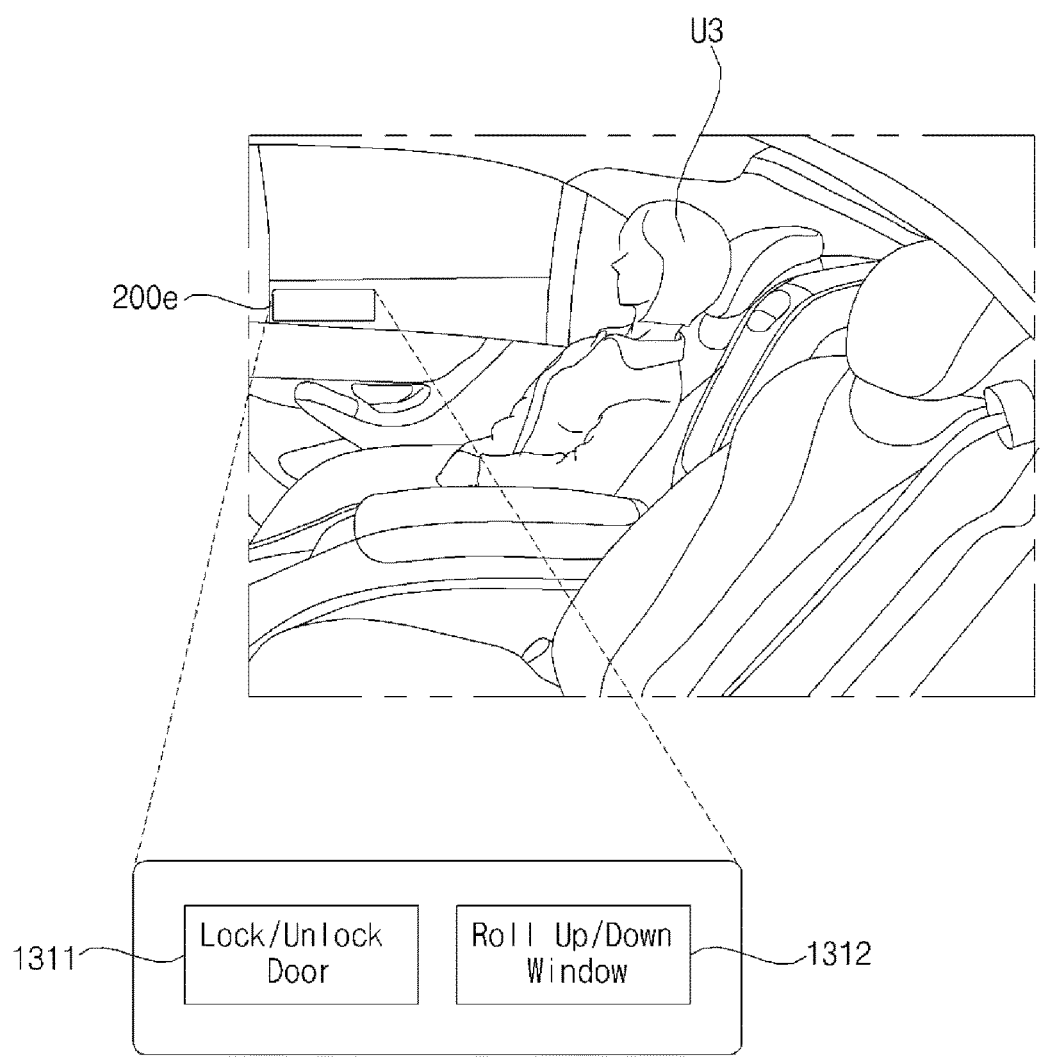

Next, FIGS. 13A and 13B illustrate control of an operation of a hidden display provided on a door in the vehicle 100 according to an embodiment of the present invention. The control will be described in the context of the fifth hidden display 200e illustrated in FIG. 7.

In particular, FIG. 13A illustrates a touch input 1310 that a user U3 applies to the fifth hidden display 200e. If the touch input 1310 to the fifth hidden display 200e matches a predetermined pattern, with no information displayed on the fifth hidden display 200e, the controller 170 can turn on the fifth hidden display 200e. Further, if a touch input that does not match the predetermined pattern is received, the controller 170 can leave the fifth hidden display 200e off.

For example, the predetermined pattern may be pressing a point in a predetermined area of the fifth hidden display 200e with pressure equal to or stronger than a threshold value. In another example, the predetermined pattern may be connecting two different points sequentially on the fifth hidden display 200e. In another example, the predetermined pattern may be touching at least one point on the fifth hidden display 200e a plurality of times within a predetermined time limit. It is obvious that many other patterns are also available.

FIG. 13B illustrates information displayed on the fifth hidden display 200e. Specifically, if the touch input of FIG. 13A matches the predetermined pattern, the controller 170 can display a menu corresponding to a function pre-associated with the fifth hidden display 200e, simultaneously with turning on the fifth hidden display 200e.

Different functions may be associated with the plurality of hidden displays 200a to 200i, and data of the function related to each hidden display may be pre-stored in the memory 130. The controller 170 can acquire data of a function associated with a specific hidden display from the memory 130 and display specific information on the specific hidden display based on the acquired data.

For example, the fifth hidden display 200e is disposed on a door of the vehicle 100 and a door locking/unlocking function and a window opening/closing function may be pre-associated with the fifth hidden display 200e. In this instance, the controller 170 can display a menu 1311 for selection of door locking or unlocking and a menu 1312 for controlling an opening/closing degree of a window on the fifth hidden display 200e.

Figure 14A:
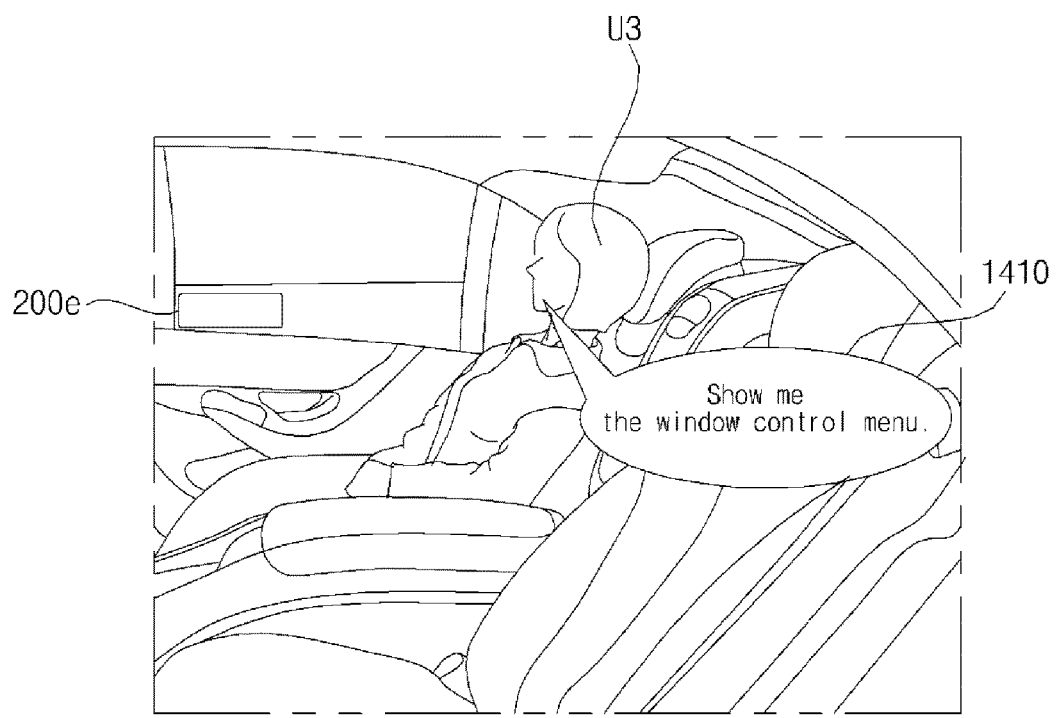
FIGS. 14A, 14B, and 14C illustrate exemplary control of an operation of a hidden display provided on a door in a vehicle according to an embodiment of the present invention.
Figure 14B:
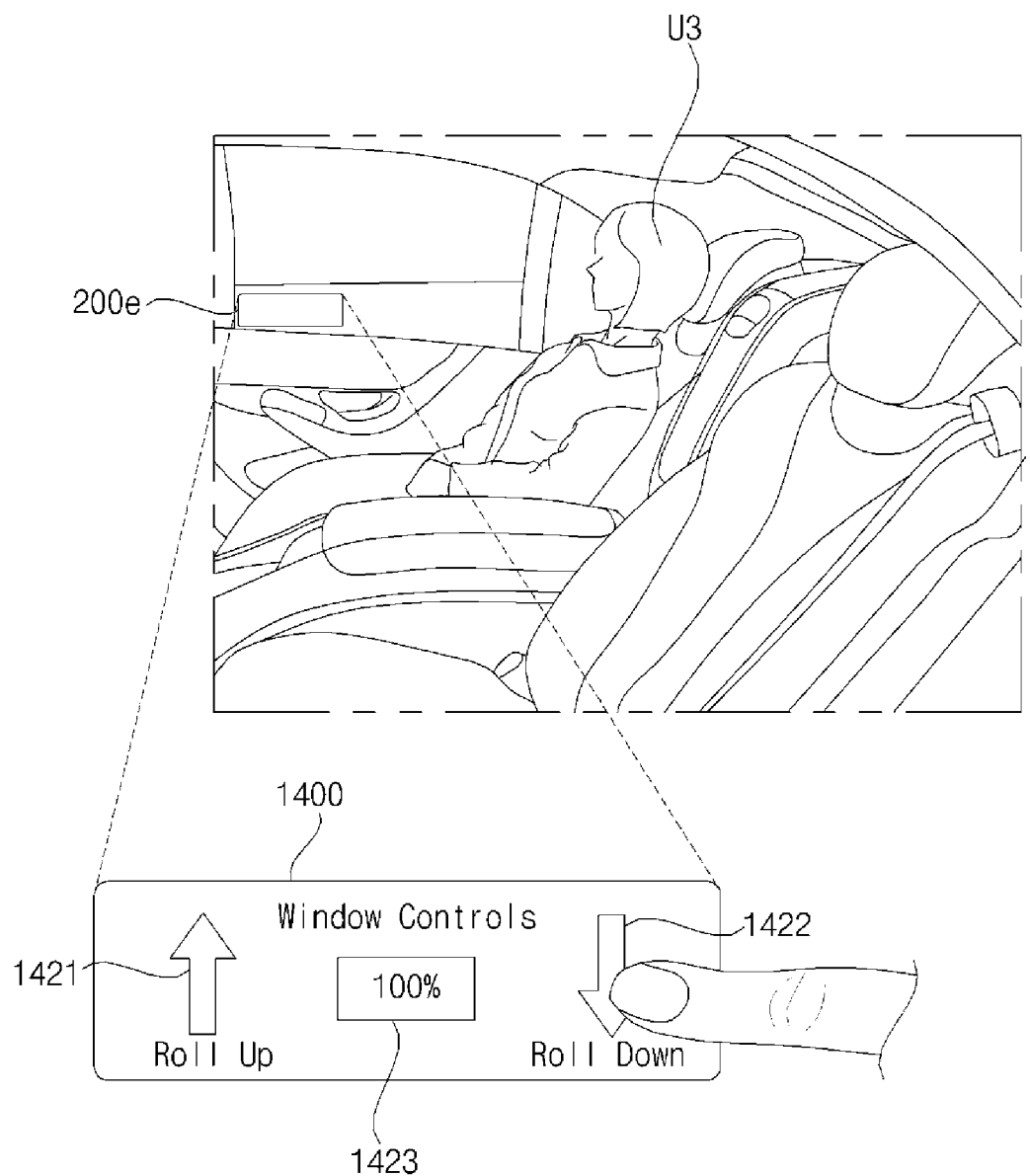
Figure 14C:
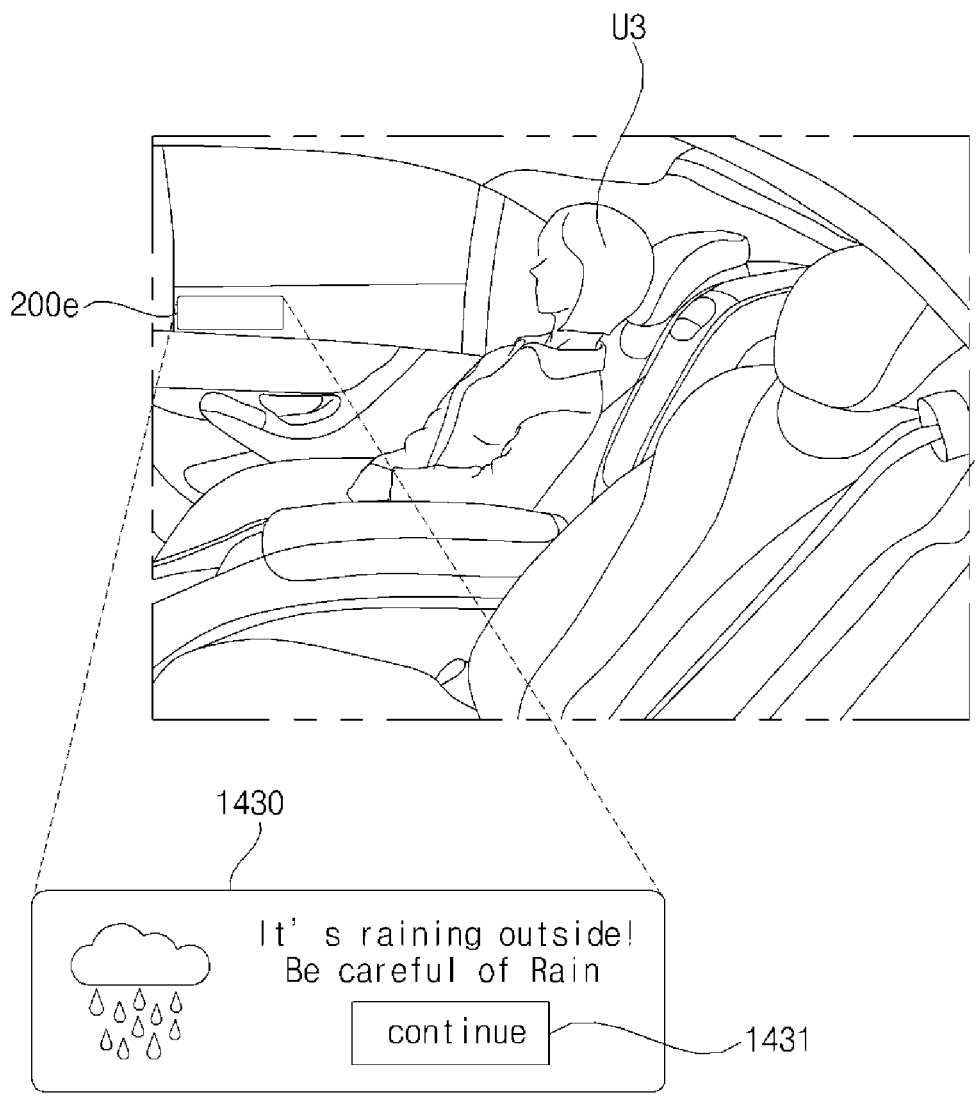

FIGS. 14A, 14B, and 14C illustrate control of an operation of a hidden display provided on a door in the vehicle 100 according to an embodiment of the present invention. The control will be described in the context of the fifth hidden display 200e illustrated in FIG. 7.

FIG. 14A illustrates an example in which the user U3 sitting in the right back seat utters voice 1410, with the fifth hidden display 200e off in the vehicle 100. The voice 1410 of the user U3 may be received at the microphone 123, and the controller 170 can receive an electrical signal corresponding to the voice 1410 of the user U3 from the microphone 123.

Also, the controller 170 can control an operation of a specific hidden display corresponding to the voice 1410 among the plurality of hidden displays 200a to 200i by the voice recognition scheme. In addition, information about at least one hidden display corresponding to each of a plurality of predetermined positions may be pre-stored in the memory 130.

In this instance, two or more hidden displays may correspond to a specific position, and two or more positions may correspond to a specific hidden display. For example, information about three hidden displays 200e, 200g, and 200i corresponding to the position of the right back seat may be pre-stored in the memory 130. If determining that the user U3 is sitting in the right back seat by means of the internal camera 122, the controller 170 can set the hidden displays 200e, 200g, and 200i as control candidates.

FIG. 14B illustrates an example in which the controller 170 controls the specific fifth hidden display 200e among the three hidden displays 200e, 200g, and 200i set as control candidates in response to the voice 1410 of the user U3.

Specifically, the controller 170 can select the fifth hidden display 200e from among the three hidden displays 200e, 200g, and 200i by recognizing 'window' in the voice 1410 according to the voice recognition scheme. For example, a window control screen 1400 may include a window roll-up button 1421, a window roll-down button 1422, and an indicator 1423 indicating a current opening degree of a window. In this instance, if the window is fully open, the indicator 1423 may indicate 0%, and if the window is completely closed, the indicator 1423 may indicate 100%.

Also, if the user U3 touches the window roll-up button 1421, the controller 170 can roll up the window. If the user U3 touches the window roll-down button 1422, the controller 170 can roll down the window. In addition, if the user U3 touches the menu 1312 illustrated in FIG. 13B, the window control screen 1400 illustrated in FIG. 14B may be displayed.

FIG. 14C illustrates weather notification screen 1430 displayed on the fifth hidden display 200e, when the user U3 touches the window roll-down button 1422 with the window completely closed as illustrated in FIG. 14B.

Specifically, the controller 170 can receive weather information for a current location of the vehicle 100 from an external server through the communication unit 110. For example, the wireless Internet module 112 of the communication unit 110 may receive the weather information from the external server.

If the received weather information indicates bad weather, the controller 170 can display the weather notification screen 1430 on the fifth hidden display 200e before rolling down the window in response to the touch on the window roll-down button 1422.

In addition, reference data may be pre-stored in the memory 130 so that it may be determined whether a current weather is bad weather based on the reference data. For example, if the current weather information indicates a rainfall of 30 mm/h, the controller 170 can determine bad weather. Besides, weather information about snow, hail, fine dust, yellow dust, ozone, or the like may be provided to the user U3 through the weather notification screen 1430.

As illustrated in FIG. 14C, a message recommending caution about bad weather outside the vehicle 100 may be displayed on the weather notification screen 1430. If the user U3 touches a button 1431 on the weather notification screen 1430, the controller 170 can roll down the window.

Figure 15A:
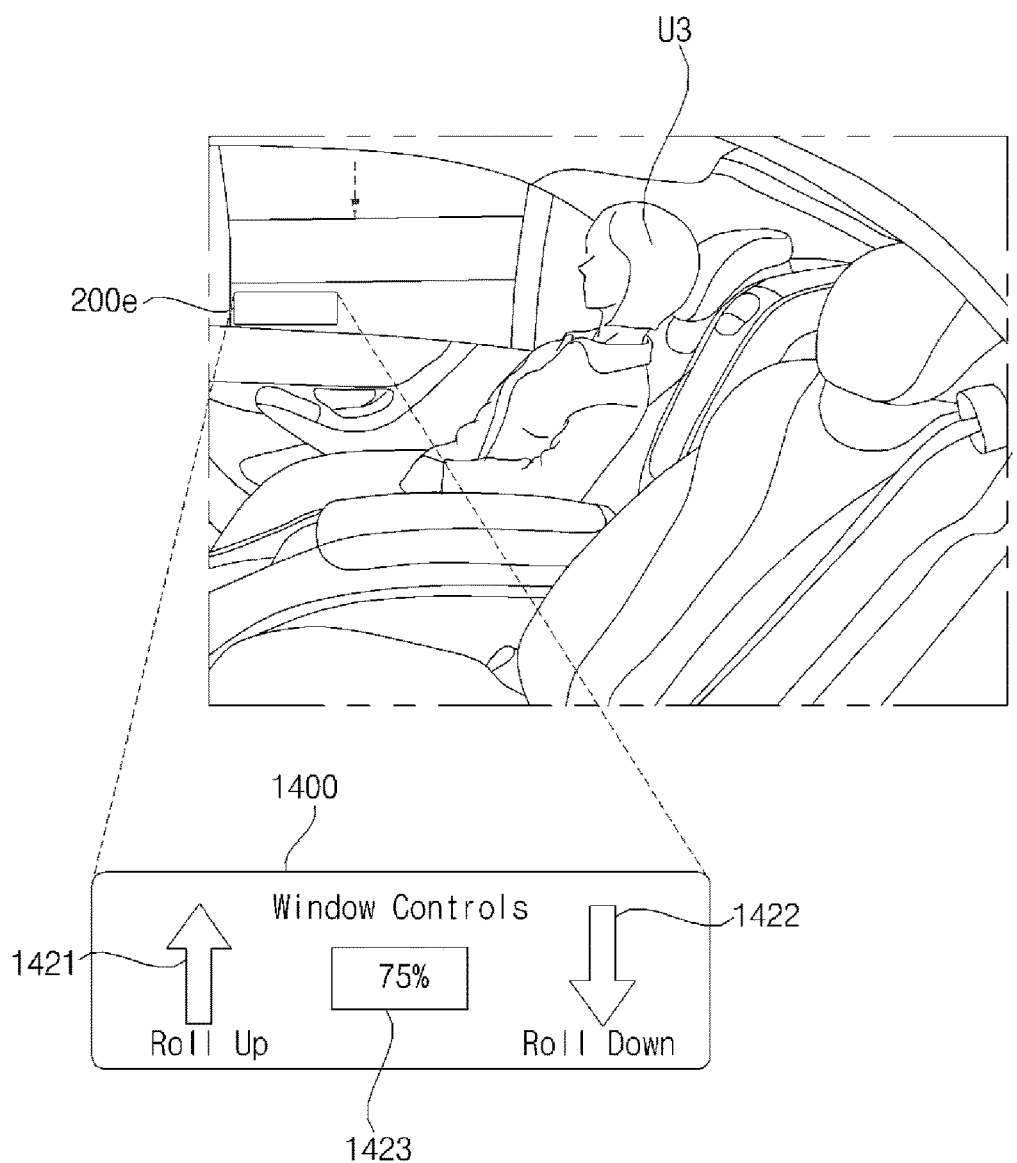
FIGS. 15A and 15B illustrate exemplary control of an operation of a hidden display provided on a door in a vehicle according to an embodiment of the present invention.
Figure 15B:
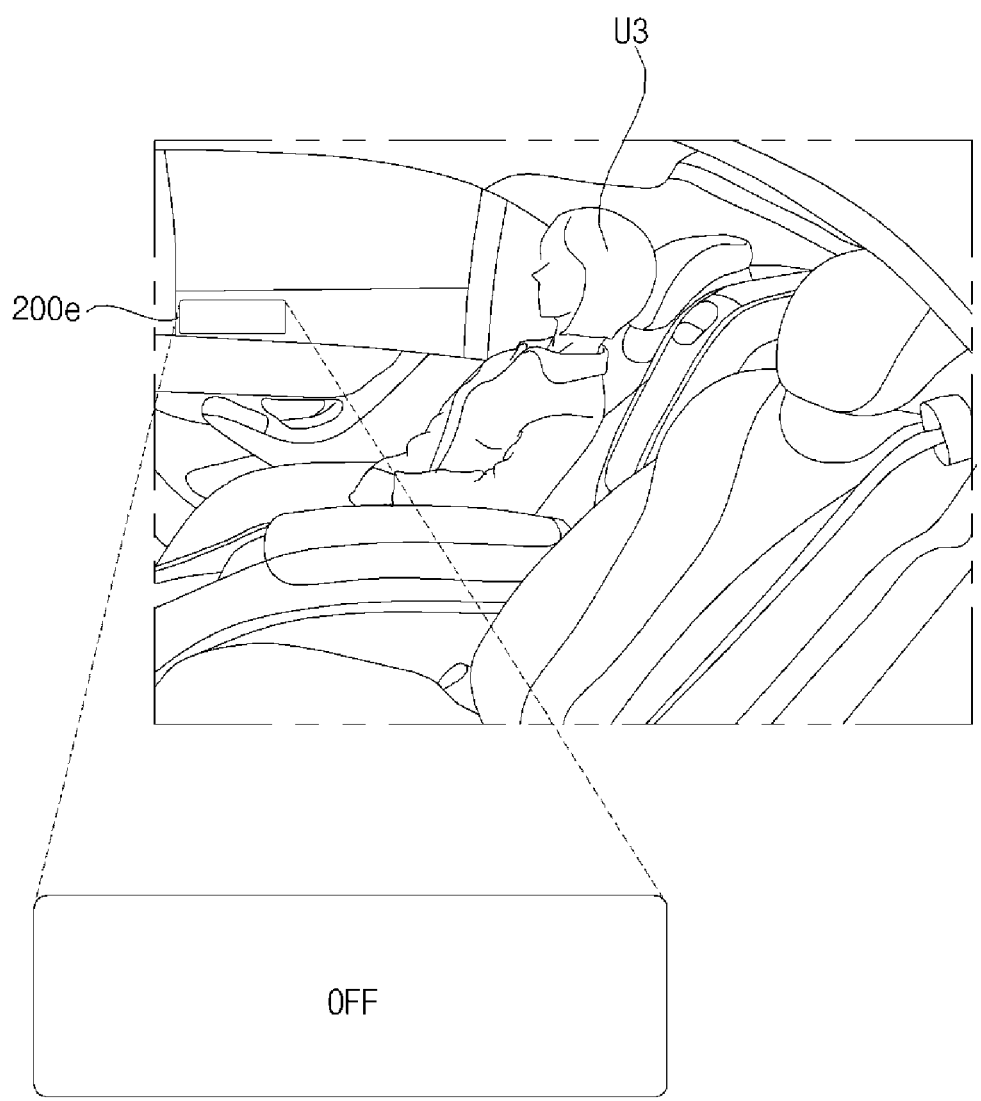

Next, FIGS. 15A and 15B illustrate control of a hidden display provided on a door in the vehicle 100 according to an embodiment of the present invention. In particular, FIG. 15A illustrates an example in which the window has been rolled down in response to the touch of the user U3 on the window roll-down button 1422 as illustrated in FIG. 14B.

The controller 170 can determine how much to roll down the window based on at least one of a touch time and the number of touches on the window roll-down button 1422. For example, each time the window roll-down button 1422 is touched once, the controller 170 can roll down the window by 1 cm. In another example, if the touch on the window roll-down button 1422 is kept for a predetermined time or longer (for example, 3 seconds or longer), the controller 170 can roll down the window completely.

Also, the controller 170 can change the indicator 1423 according to an opening degree of the window. For example, if the window has been rolled down by ¼ in a complete closed state in response to the touch on the window roll-down button 1422, the indicator 1423 may indicate from 100% to 75%.

FIG. 15B illustrates an example in which the controller 170 executes an automatic turn-off function for the fifth hidden display 200e. If a touch input has not been received for a predetermined time or longer with a specific hidden display on, the controller 170 can automatically turn off the specific hidden display. For example, if no touch input has been received from the user U3 for 10 seconds or longer from a time when the window control screen 1400 is initially displayed on the fifth hidden display 200e as illustrated in FIG. 15A, the controller 170 can automatically turn off the fifth hidden display 200e.

Obviously, even though a predetermined time has not elapsed, the controller 170 can turn off the fifth hidden display 200e according to a predetermined user input. For example, the controller 170 can turn off the fifth hidden display 200e in response to a voice command 'Turn off the screen'. In another example, the input unit 120 may include physical buttons for turning on and off each of the hidden displays 200a to 200i. When a user presses one of the physical buttons, the controller 170 can turn off a specific hidden display corresponding to the pressed button.

Figure 16A:
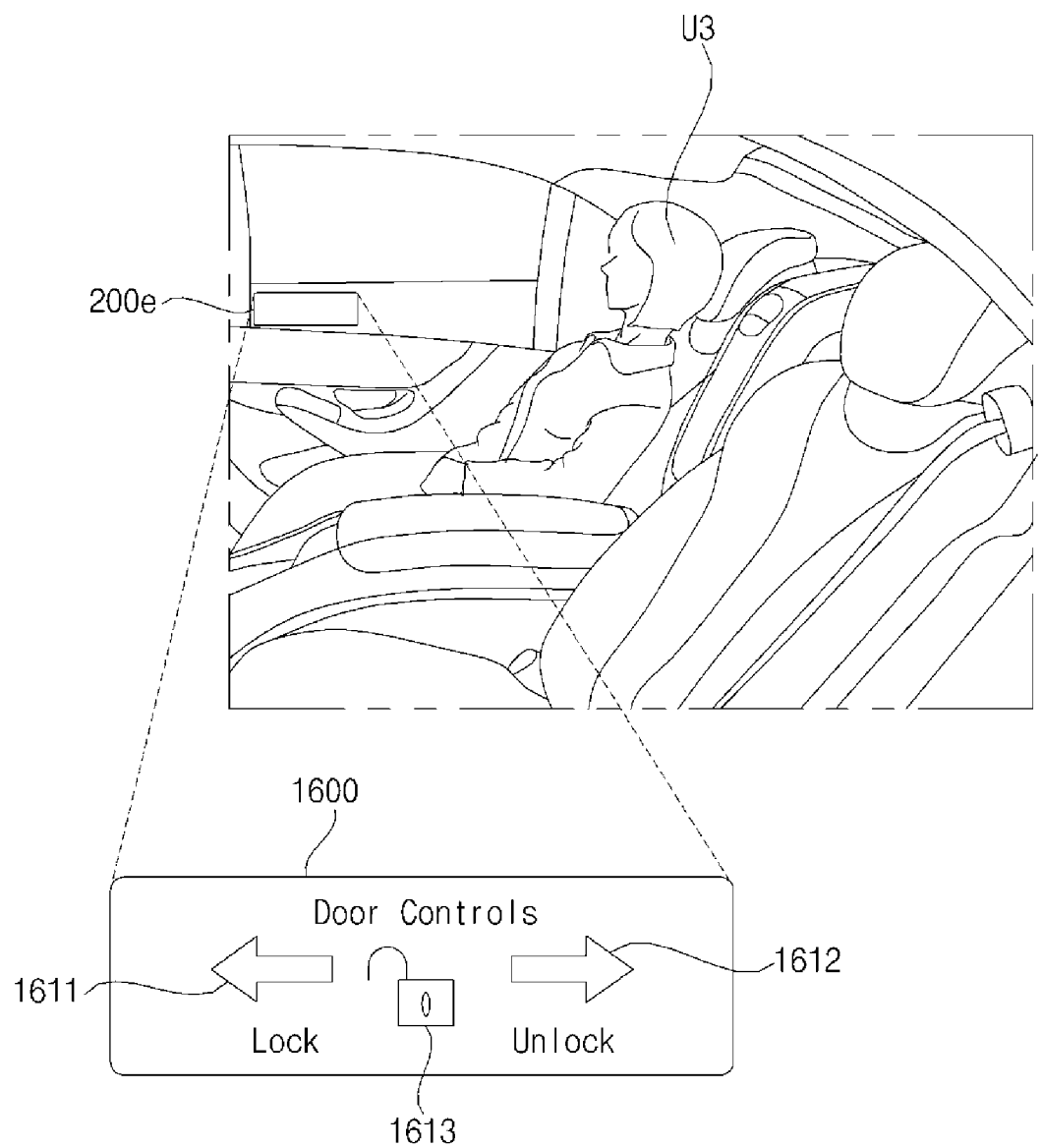
FIGS. 16A and 16B illustrate exemplary control of an operation of a hidden display provided on a door in a vehicle according to an embodiment of the present invention.
Figure 16B:
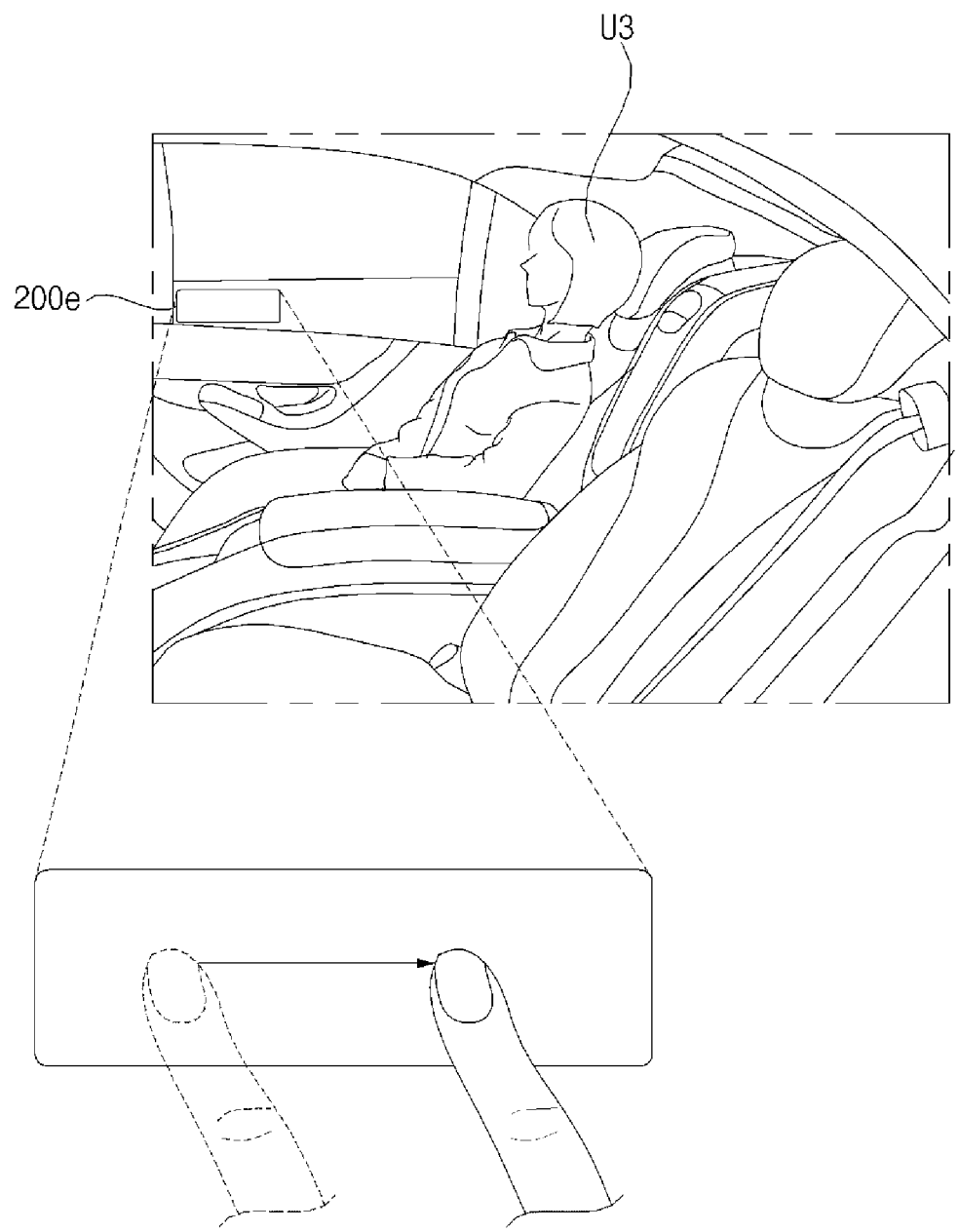

FIGS. 16A and 16B illustrate control of an operation of a hidden display provided on a door in the vehicle 100 according to an embodiment of the present invention. In particular, FIG. 16A illustrates an example in which a door control screen 1600 is displayed on the fifth hidden display 200e. For example, when the user U3 touches the menu 1311 illustrated in FIG. 13B, the door control screen 1600 may be displayed on the fifth hidden display 200e as illustrated in FIG. 16A.

In addition, the door control screen 1600 may include buttons selectable for locking and unlocking a door. For example, as illustrated in FIG. 16A, the door control screen 1600 may include a door lock button 1611 and a door unlock button 1612. Further, the door control screen 1600 may include an indicator 1613 indicating the locked or unlocked state of the door. For example, the indicator 1613 may be an icon indicating that the door is currently unlocked.

If the user U3 touches the door lock button 1611 with the door unlocked, the controller 170 can lock the door. In this instance, the indicator 1613 may be changed to an icon indicating that the door is currently locked. When the user U3 touches the door unlock button 1612 with the door locked, the controller 170 can unlock the door.

FIG. 16B illustrates an example in which the locked state of the door is changed according to a touch of the user U3, with a screen of the fifth hidden display 200e off. In the present invention, turn-off of a hidden display may mean that only the display panel 212 of the hidden display is turned off. In this instance, the touch panel 214 may be kept on so that a touch input of the user may be sensed.

As illustrated, if a touch input of the user U3 to the fifth hidden display 200e is a drag input moved from left to right for a predetermined distance, the controller 170 can unlock the door. Further, if a touch input of the user U3 to the fifth hidden display 200e is a drag input moved from right to left for a predetermined distance, the controller 170 can lock the door.

While it has been described with reference to FIG. 16B that a door is locked and unlocked according to a left to right drag input with the screen of the fifth hidden display 200e off, the present invention is not limited thereto. For example, if the user applies an upward drag input for a predetermined distance or farther, the controller 170 can perform a window roll-up operation. If the user applies a downward drag input for a predetermined distance or farther, the controller 170 can perform a window roll-down operation.

While FIGS. 16A and 16B have been described in the context of the fifth hidden display 200e, it is obvious to those skilled in the art that other hidden displays may be controlled in the same manner.

Figure 17A:
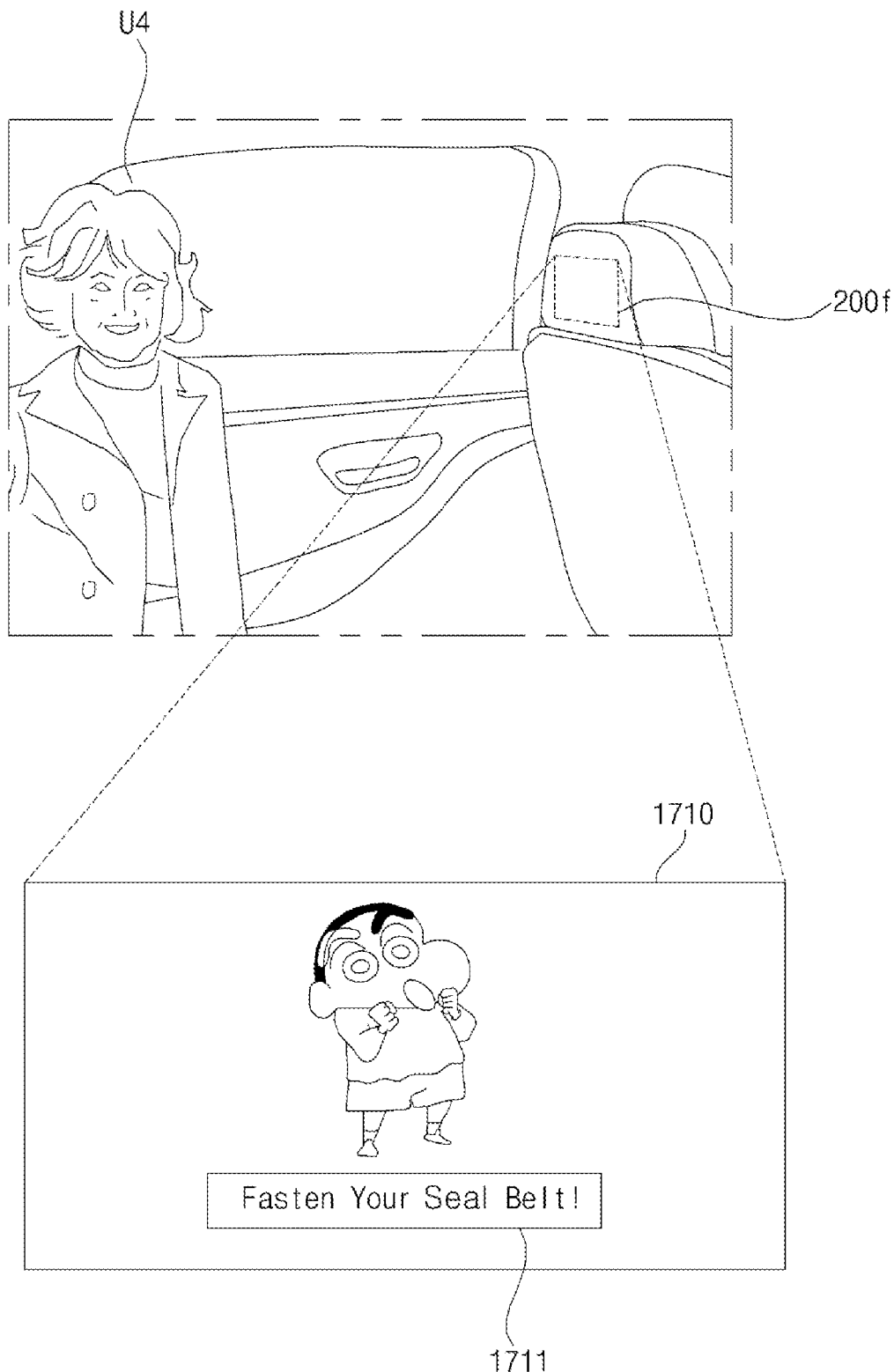
FIGS. 17A and 17B illustrate an exemplary operation for changing information displayed on a hidden display according to identification of a user in a vehicle according to an embodiment of the present invention.
Figure 17B:
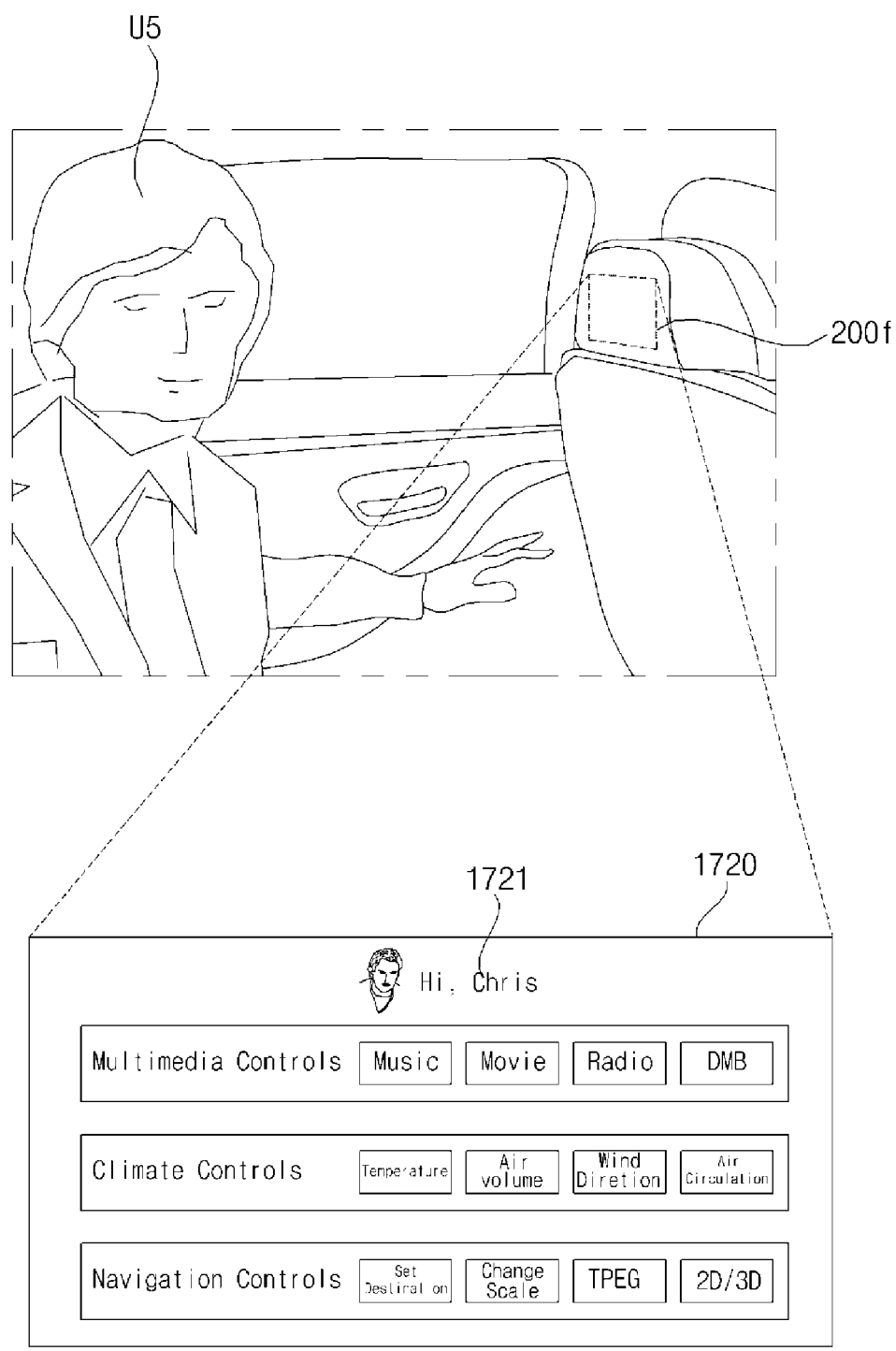

FIGS. 17A and 17B illustrate an operation for displaying different information on a hidden display according to an identified user in the vehicle 100 according to an embodiment of the present invention.

FIG. 17A illustrates when a user U4 is sitting in the left back seat in the vehicle 100. The controller 170 can determine that the user U4 is sitting in the left back seat of the vehicle 100 using the internal camera 122 or a weight sensor. Accordingly, the controller 170 can automatically turn on the sixth hidden display 200f.

Also, the controller 170 can identify the user U4 based on images received from the internal camera 122. For example, the controller 170 can acquire age information about the user U4 by comparing a facial part of the user U4 appearing in an image received from the internal camera 122 with the facial images pre-stored in the memory 130.

If there is no facial image matching the face of the user U4 in the memory 130, the controller 170 can estimate the age of the user U4 based on a face and body size in an image. Or the controller 170 can estimate the age of the user U4 based on a weight measured by the weight sensor. For example, if the weight measured by the weight sensor is less than a predetermined threshold (for example, 20 Kg), it may be determined that the user U4 is a baby.

If determining that the user U4 is a baby, the controller 170 can display content 1710 configured for babies among a plurality of contents stored in the memory 130 on the sixth hidden display 200f. For example, the content 1710 for babies displayed on the sixth hidden display 200f may be a movie for babies.

Also, the controller 170 can display safety-related information along with the content 1710 for babies on the sixth hidden display 200f. For example, if the user U4 does not wear a seat belt, the controller 170 can display a message 1711 requesting fastening of a seat belt overlapped with the content 1710 for babies.

Compared to FIG. 17A, FIG. 17B illustrates an example that a user U5 sitting in the left back seat is an adult. The controller 170 can acquire identification information about the user U5 based on at least one of an image received from the internal camera 122 and a weight measured by the weight sensor. Also, if the controller 170 determines that the user U5 is an adult based on an age indicated by the identification information about the user U5, the controller 170 can display a UI 1720 on the sixth hidden display 200f.

If the name of the user U5 is 'Chris', the controller 170 can display a message 1721 related to the user U5 (for example, "Hi, Chris") overlapped with the UI 1720.

Figure 18A:
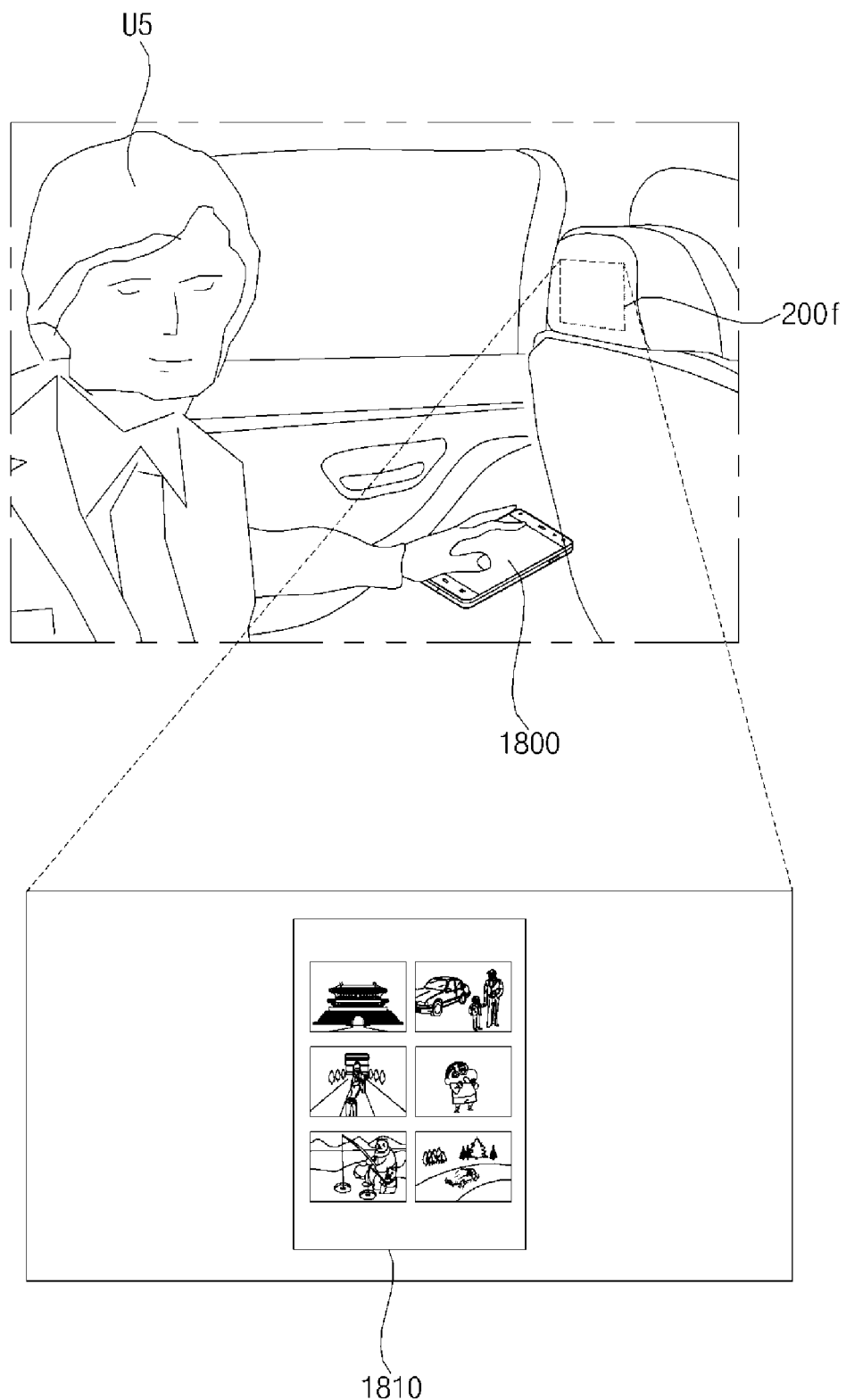
FIGS. 18A and 18B illustrate an exemplary operation for displaying a screen of a mobile device located inside a vehicle on a hidden display in the vehicle according to an embodiment of the present invention.
Figure 18B:
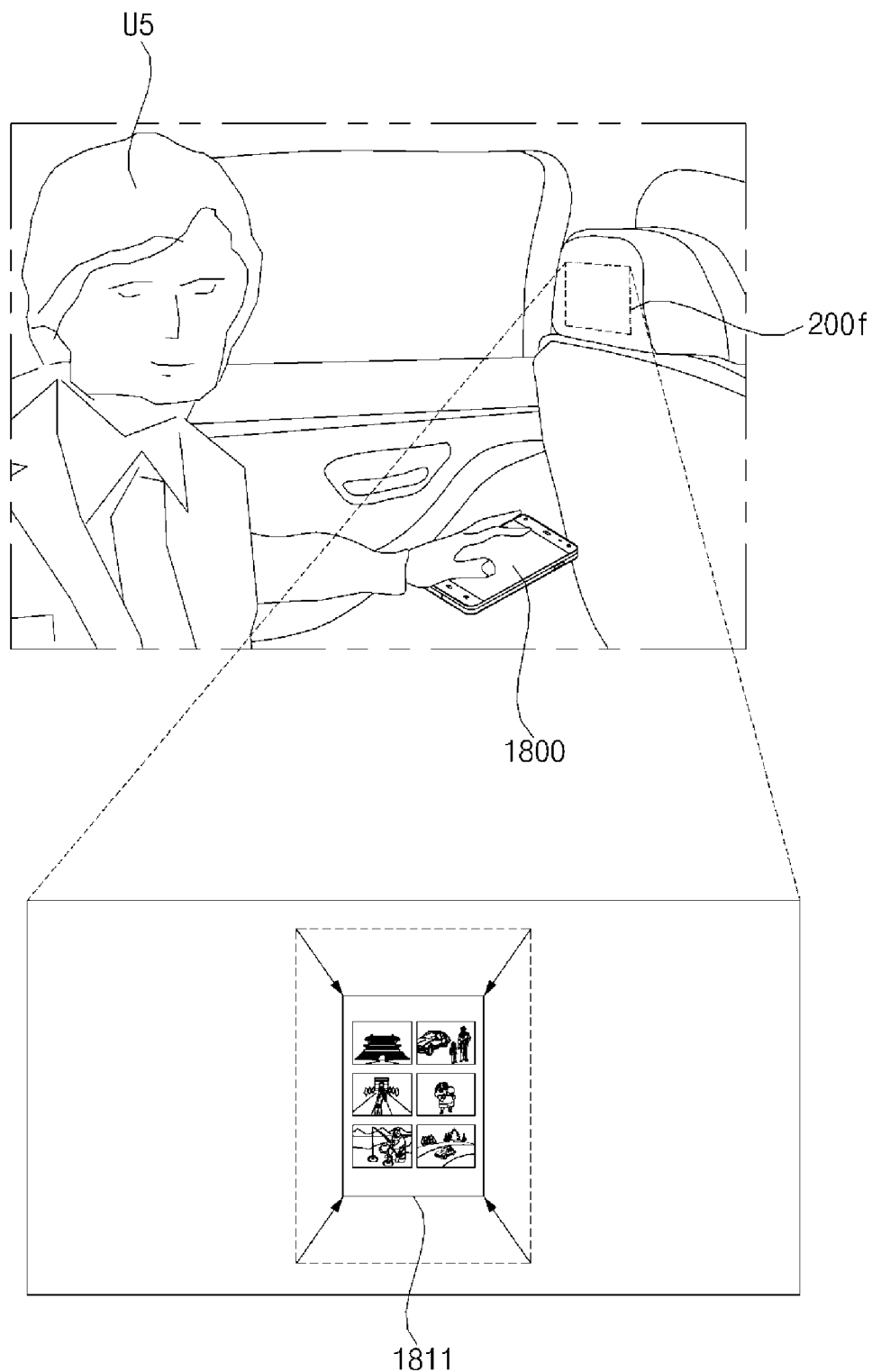

Next, FIGS. 18A and 18B illustrate an operation for displaying a screen of a mobile device located inside the vehicle on a hidden display according to an embodiment of the present invention. In particular, FIG. 18A illustrates an example in which a screen of a mobile device 1800 of the user U5 is shared on the sixth hidden display 200f corresponding to the position of the user U5. That is, the controller 170 can mirror an image displayed on the screen of the mobile device 1800 onto a screen of the sixth hidden display 200f. Therefore, the user U5 can view the same image on the different devices 200f and 1800.

The mobile device 1800 may be any of portable electronic devices including, for example, a portable phone, a smart phone, a laptop computer, a digital broadcasting terminal, a Personal Digital Assistant (PDA), a Portable Multimedia Player (PMP), a tablet PC, an ultrabook, and a wearable device.

The communication unit 110 may exchange data with the mobile device 1800 by establishing a wired/wireless connection with the mobile device 1800. For example, the short-range communication module 113 of the communication unit 110 may be paired with the mobile device 1800 inside the vehicle 100 and receive an image displayed on the screen of the mobile device 1800. Further, the controller 170 can display an image 1810 received from the mobile device 1800 on the specific hidden display 200*f* among the hidden displays 200*a* to 200*i*. The wireless communication connection may be established between the short-range communication module 113 and the mobile device 1800 in conformance to a wireless communication protocol such as Wi-Fi, Wi-Fi Direct), infrared communication, Zigbee, NFC, RFID, Bluetooth, or UWB.

Or the communication unit 110 may display the image 1810 displayed on the screen of the mobile device 1800 on the sixth hidden display 200*f* corresponding to the position of the user U5 through wired communication such as USB or Mobile High-Definition Link (MHL).

The screen size of the sixth hidden display 200*f* may be larger than the screen size of the mobile device 1800. The controller 170 can enlarge the image displayed on the mobile device 1800 in correspondence with a screen size ratio between the two devices 200*f* and 1800 and then display the enlarged image on the sixth hidden display 200*f*.

FIG. 18B illustrates an example in which the size of the image 1810 is changed in response to a user input for the image 1810 displayed on the sixth hidden display 200*f*. For example, if the user U5 applies a pinch-in gesture input to an area in which the image 1810 is displayed, the controller 170 can display an image 1811 smaller than the image 1810 by a predetermined ratio on the sixth hidden display 200*f* in response to the pinch-in gesture input. While not shown, if the user U5 applies a pinch-out gesture input to an area in which the image 1810 is displayed, the controller 170 can display an image larger than the image 1810 by a predetermined ratio on the sixth hidden display 200*f* in response to the pinch-out gesture input.

Figure 19:
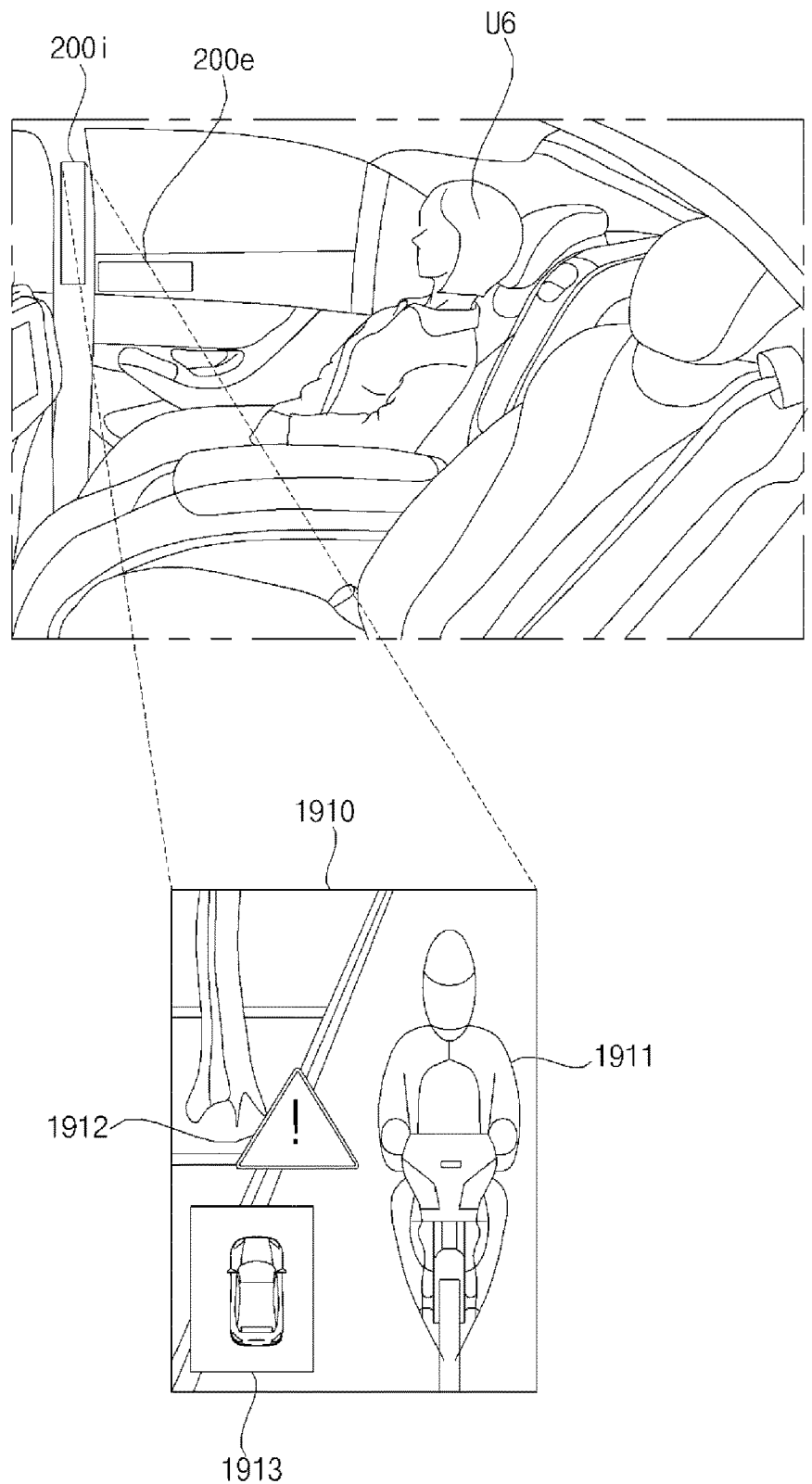
FIG. 19 illustrates an exemplary operation for displaying an image of the surroundings of a vehicle on a hidden display in the vehicle according to an embodiment of the present invention.

FIG. 19 illustrates an operation for displaying an outside image of the vehicle 100 on a hidden display in the vehicle 100 according to an embodiment of the present invention. Referring to FIG. 19, the controller 170 can display an outside image 1910 on at least one hidden display corresponding to the position of a user U6.

For example, if the user U6 is sitting in the right back seat of the vehicle 100 as illustrated in FIG. 19, the controller 170 can display the outside image 1910 on the ninth hidden display 200*i* disposed on the right B-pillar. The outside image 1910 may be provided by the right camera 161*c* illustrated in FIG. 3B.

That is, if the user U6 is sitting in the right back seat of the vehicle 100, the controller 170 can display the outside image 1910 received from the right camera 161*c* on the ninth hidden display 200*i*. Further, if the user U6 is sitting in the left back seat, the controller 170 can display an outside image received from the left camera 161*b* on the eighth hidden display 200*h*.

In addition, the controller 170 can detect an object 1911 in the outside image 1910. Also, the controller 170 can calculate a collision risk index between the object 1910 and the vehicle 100 based on at least one of the type, size, speed, and direction of the object 1911 and the distance between the object 1911 and the vehicle 100. If the calculated collision risk index exceeds a predetermined threshold, the controller 170 can display an indicator 1912 indicating the risk of colliding with the object 1911, overlapped over the outside image 1910.

Further, the controller 170 can display an AVM image 1913 at a part of the ninth hidden display 200*i*. As described before with reference to FIG. 3C, the controller 170 can generate the AVM image 1913 in real time or periodically by synthesizing images received from the external cameras 161*a* to 161*d*, and display the AVM image 1913 in a Picture In Picture (PIP) manner.

In addition, the outside image 1910 may be displayed on the ninth hidden display 200*i*, only under a specific condition. For example, if the user U6 unlocks a door while the vehicle 100 is stationary, the controller 170 can display the outside image 1910 on the ninth hidden display 200*i*. Accordingly, the user U6 may readily recognize the presence of the object 1911 in the outside image 1910. Thus, when the object 1911 passes by, the user U6 may open the door and get off safely.

Figure 20A:
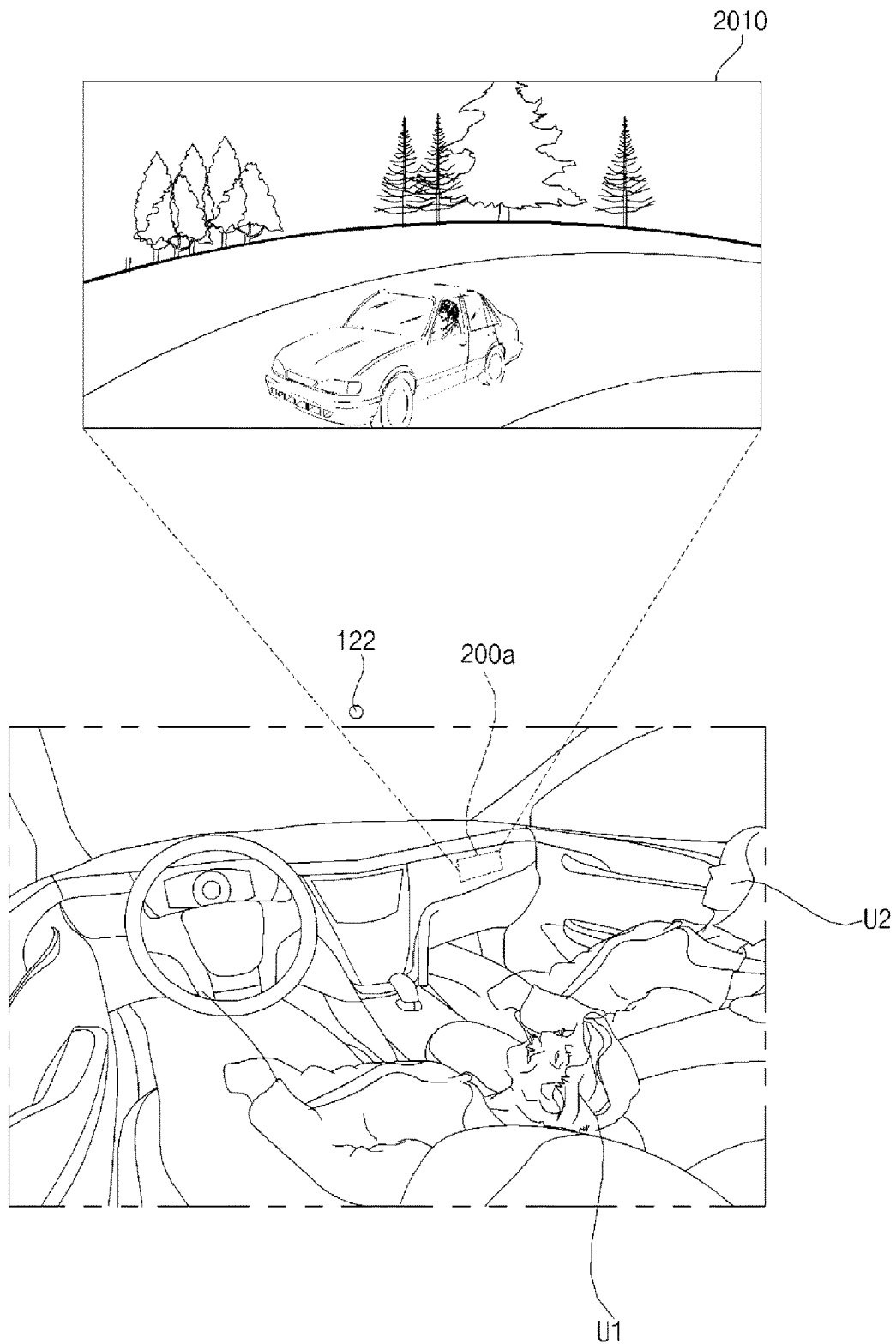
FIGS. 20A, 20B, and 20C illustrate an exemplary operation for displaying an alarm indicator on a hidden display in a vehicle according to an embodiment of the present invention.
Figure 20B:
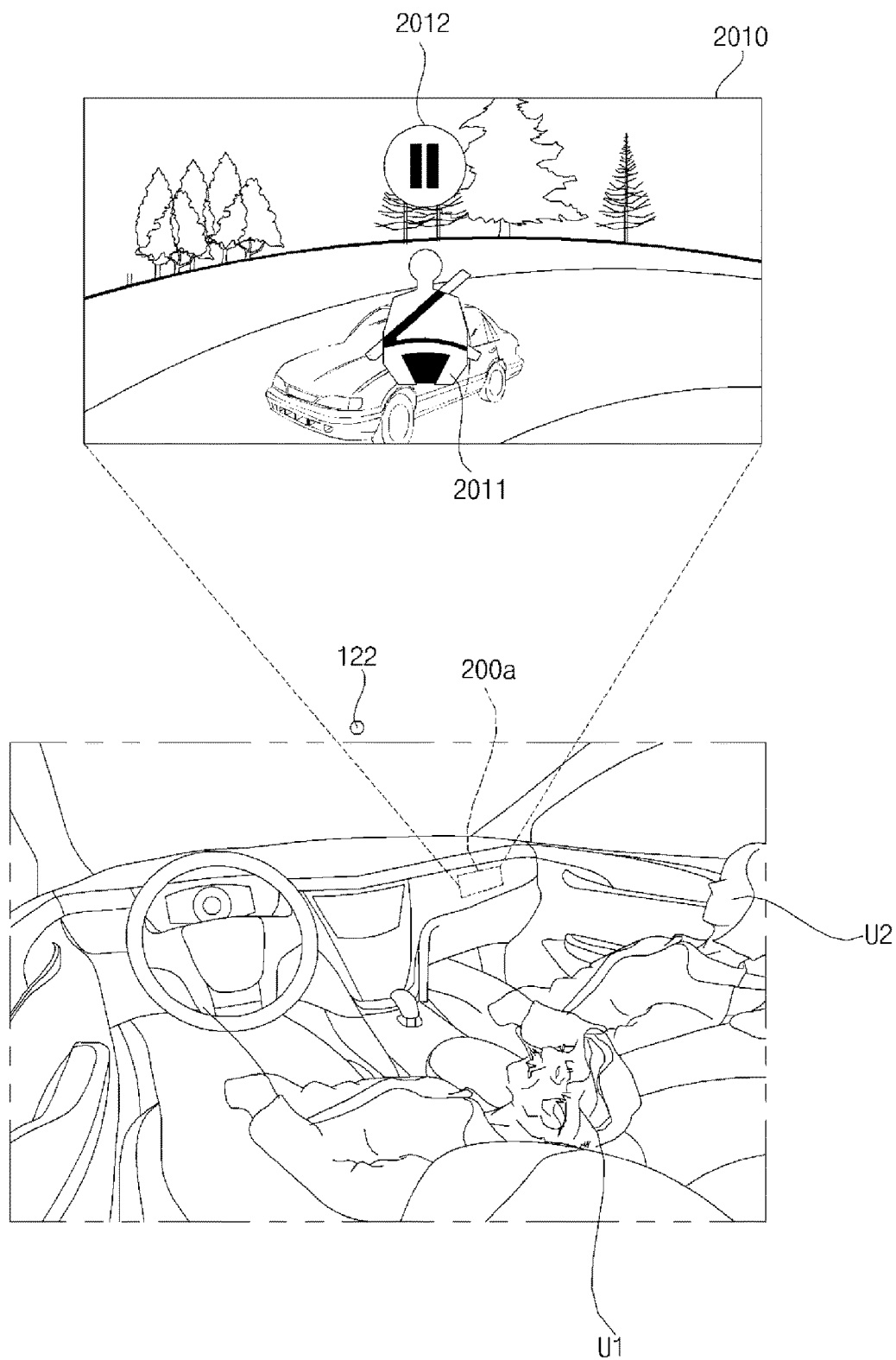
Figure 20C:
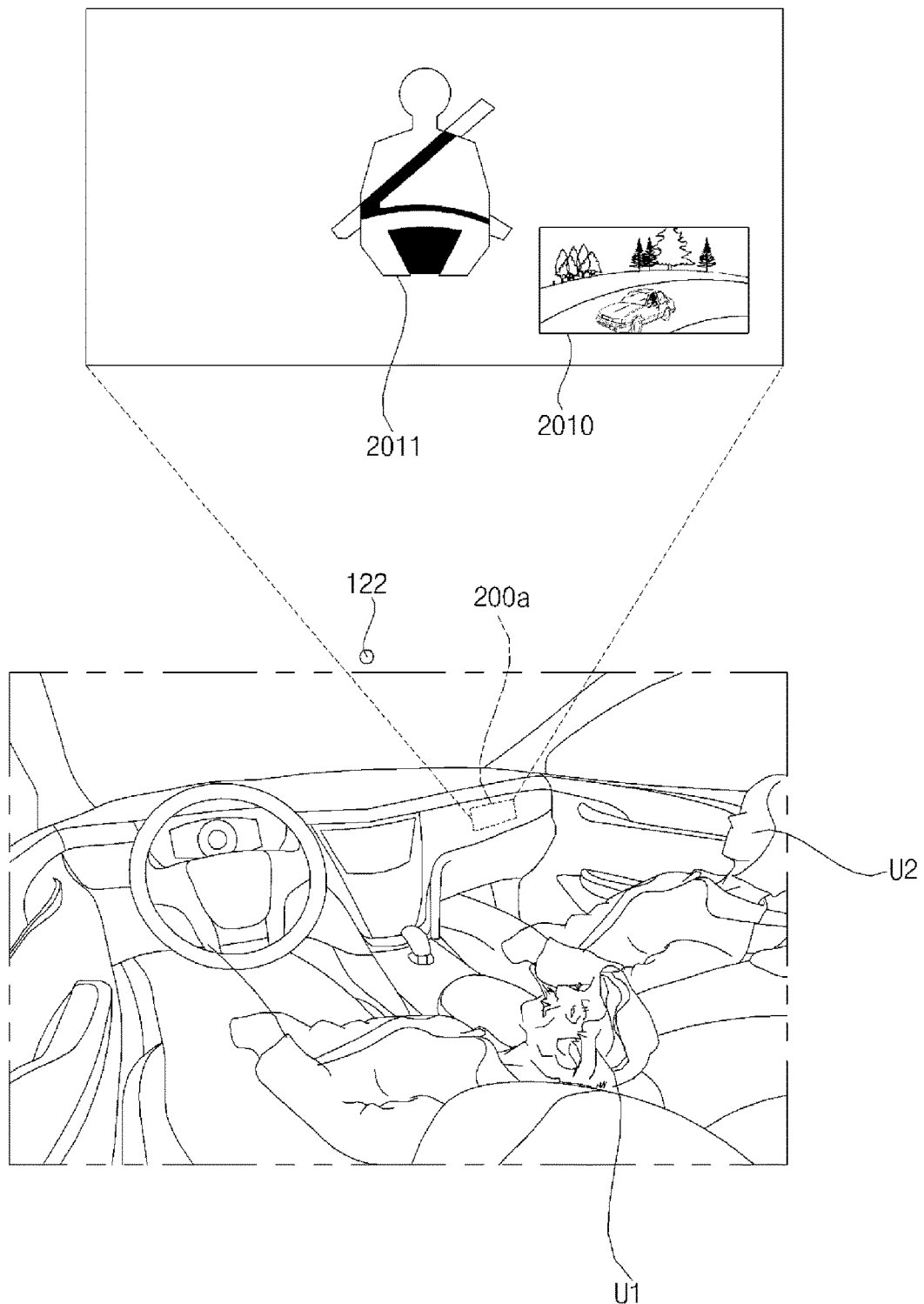

FIGS. 20A, 20B, and 20C illustrate an operation for displaying an alarm indicator on a hidden display in the vehicle 100 according to an embodiment of the present invention.

The controller 170 can display an alarm indicator corresponding to at least one of the traveling situation and position of the vehicle 100 on at least one of the hidden displays 200*a* to 200*i*. Data of the traveling situation of the vehicle may be provided by the sensing unit 160 illustrated in FIG. 1. Information about the position of the vehicle 100 may be provided by the location information module 114 of the communication unit 110.

FIG. 20A illustrates an example in which when the user U2 sitting in the passenger seat selects a movie play button in the multimedia control menu 1010 as illustrated in FIG. 10B, a movie play screen 2010 triggered by play of a specific movie is displayed on the first hidden display 200*a*. For example, if the vehicle 100 is parked or stopped or is moving below a predetermined speed (for example, 10 Km/h), even though the user U2 has not fastened a seat belt, the controller 170 can display no other information than the movie play screen 2010 on the first hidden display 200*a*.

FIG. 20B illustrates an example in which an alarm indicator 2011 corresponding to at least one of the traveling situation and position of the vehicle 100 on the first hidden display 200*a* during play of a movie. For example, if the vehicle 100 is moving at or above a predetermined speed (for example, 10 Km/h) or enters an expressway, the controller 170 can display the alarm indicator 2011 encouraging fastening of a seat belt on the first hidden display 200*a*.

In this instance, the controller 170 can display the alarm indicator 2011 on the movie play screen 2010 in the PIP manner. That is, the alarm indicator 2011 may be displayed smaller than the movie play screen 2010. Further, the controller 170 can temporarily pause the movie play screen 2010 and display an indicator 2012 indicating temporary pause of the movie play screen 2010 on the first hidden display 200*a*.

FIG. 20C illustrates an exemplary change of information displayed on the first hidden display 200*a*. Referring to FIG. 20C, if the user U2 does not respond to the indicator 2012, that is, if the user U2 does not fasten a seat belt until a predetermined time (for example 5 seconds) elapses after the initial appearance of the indicator 2011, the controller 170 can enlarge the indicator 2011, while contracting the movie play screen 2010. In this instance, the size of the enlarged indicator 2011 may be larger than the size of the contracted movie play screen 2010.

If the user U2 fastens a seat belt in this state, the controller 170 can automatically resume to play the movie, without displaying the indicator 2012 any longer on the first hidden display 200a.

Figure 21A:
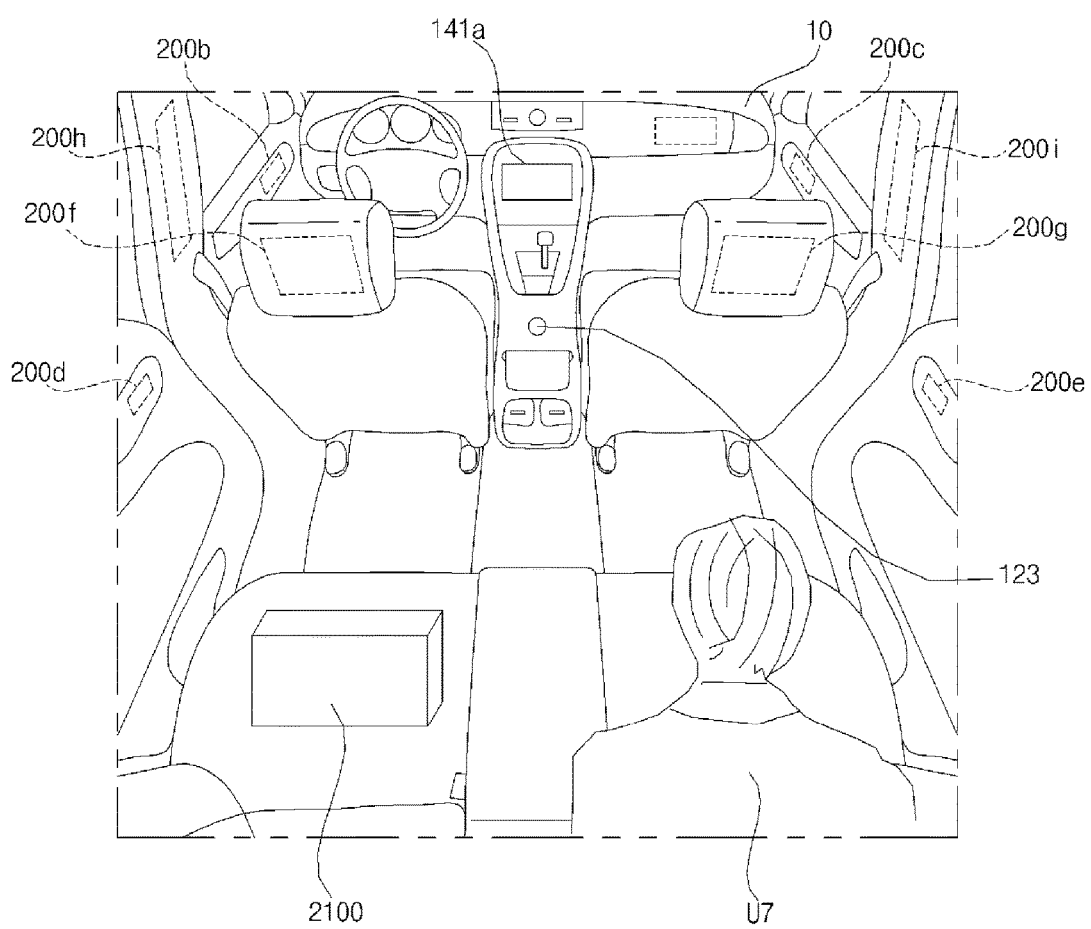

FIGS. 21A and 21B illustrate an operation for displaying an alarm indicator on a hidden display in the vehicle 100 according to an embodiment of the present invention.

As described before, a weight sensor can be provided per seat in the vehicle 100. The controller 170 can measure the weight of each seat using the weight sensors before and after a user gets on the vehicle 100. If the difference between the weight measured before the user gets on the vehicle 100 and the weight measured after the user gets on the vehicle 100 is equal to or larger than a predetermined threshold, the controller 170 can display, on a hidden display, an alarm message telling the user not to leave his or her belongings behind in the vehicle 100 before the user gets off the vehicle 100.

FIG. 21A illustrates an example in which a user U7 is sitting in the right back seat of the vehicle 100 and an object 2100 is placed on the left back seat. In this instance, the user U7 can touch the door unlock button 1612 of the door control screen 1600 illustrated in FIG. 16A in order to get off the vehicle 100.

FIG. 21B illustrates an alarm message 2110 displayed on a specific hidden display 200g, when the user U7 touches the door unlock button 1612 of the door control screen 1600. For example, when the user U7 is to get off the vehicle 100, the controller 170 can determine whether there is the object 2100 on at least one of the seats of the vehicle 100 based on a weight measured by a weight sensor.

If the controller 170 determines the presence of the object 2100 in the vehicle 100, the controller 170 can display an alarm message 2110 on the seventh hidden display 200g corresponding to the position of the user U7. In this instance, the alarm message 2110 may include information about the position of the object 2100. Therefore, the user U7 is relieved of inconvenience caused by loss of the object 2100 or retrieval of the object 2100.

In addition, while it has been described with reference to FIGS. 21A and 21B that a plurality of weight sensors are provided for the seats of the vehicle 100, the present invention is not limited thereto. For example, one of the weight sensors may be disposed at the floor inside the vehicle 100 and another weight sensor may be disposed in the trunk, to thereby measure the weight of a passenger or a baggage.

Figure 22:
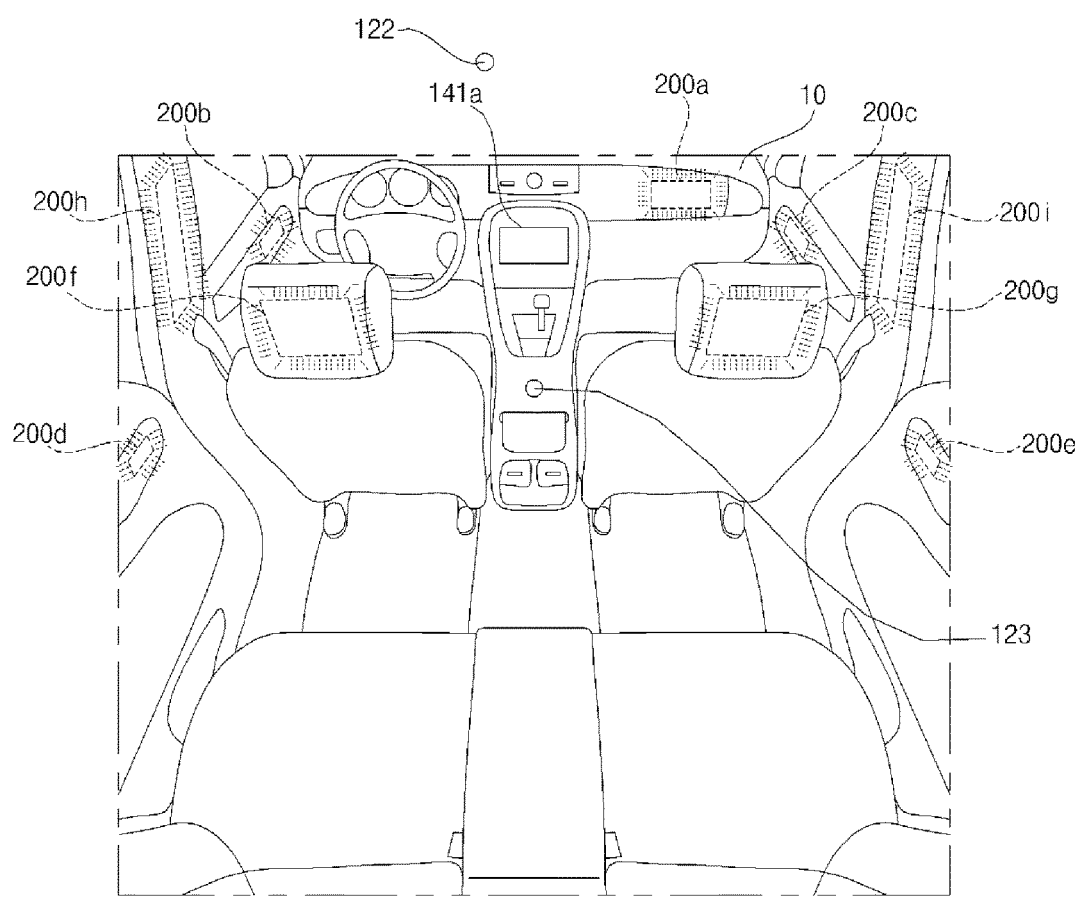
FIG. 22 illustrates an exemplary operation for controlling the screen color of each of a plurality of hidden displays according to a preset scenario in a vehicle according to an embodiment of the present invention.

FIG. 22 illustrates an operation for controlling the screen color of each of the hidden displays 200a to 200i according to a preset scenario in the vehicle 100 according to an embodiment of the present invention.

When the plurality of hidden displays 200a to 200i are disposed inside the vehicle 100, the controller 170 can control the screen color of at least one of the hidden displays 200a to 200i according to a preset scenario.

Data of a plurality of scenarios for controlling the screen colors of the hidden displays 200a to 200i may be pre-stored in the memory 130. The controller 170 can select a specific scenario corresponding to a user input or the traveling situation of the vehicle 100 and control the screen color of each of the hidden displays 200a to 200i based on the selected specific scenario.

For example, a first scenario among the plurality of scenarios may include control data with which the screens of the hidden displays 200a to 200i are displayed in a first color (for example, blue) at the same time for a predetermined time. In another example, a second scenario among the plurality of scenarios may include control data with which the screens of the hidden displays 200a to 200i flicker in a second color (for example, yellow) simultaneously at every predetermined interval. In another example, a third scenario among the plurality of scenarios may include control data with which the screens of the hidden displays 200a to 200i are displayed in different colors.

FIG. 22 illustrates an example in which the screens of the hidden displays 200a to 200i are controlled to be displayed in the same first color (for example, blue) according to the afore-mentioned first scenario. In this instance, the controller 170 can display predetermined content. (for example, a photo list) mapped to the first scenario on at least one of the hidden displays 200a to 200i. According to FIG. 22, a user can create various interior atmospheres according to his or her mood or a traveling situation.

As is apparent from the foregoing description, the vehicle and the method for controlling the vehicle according to an embodiment of the present invention have the following effects.

According to at least one of the embodiments of the present invention, since the vehicle includes at least one display equipped with a cover having a predetermined light transmittance, a sense of visual difference between the display and other interior parts can be reduced and distraction of a user's vision can be suppressed.

According to at least one of the embodiments of the present invention, the use efficiency of a user can be increased by displaying different information on each display according to the position of each user in the vehicle, the traveling situation of the vehicle, a touch input, or the like.

According to at least one of the embodiments of the present invention, information corresponding to inside and outside situations of the vehicle can be provided on a display.

The above-described embodiments of the present invention may be implemented not only by an apparatus and a method but also by a program for implementing functions corresponding to the configurations of the embodiments of the present invention or a recording medium recording the program. Those skilled in the art will readily realize the implementation from the foregoing description of the embodiments of the present invention.

Because many replacements, variations, and modifications can be made to the present invention without departing the scope and spirit of the present invention, the present invention is not limited by the foregoing embodiments and the attached drawings. Rather, many modifications can be made by selectively combining the whole or a part of each embodiment.

What is claimed is:

1. A vehicle comprising:
   a plurality of displays disposed at different positions inside the vehicle, each display including a touch screen and a cover layer on a top surface of the touch screen, the cover layer of a corresponding display having a color characteristic based on an interior part of the vehicle having the display such that when the corresponding display is off, the corresponding display appears hidden;
   a sensor configured to detect a seat location of a person seated in the vehicle; and a controller configured to:
selectively control the plurality of the displays based on the detected seat location of the person seated in the vehicle,
wherein a light transmittance of the cover layer is equal to or larger than 10% and equal to or smaller than 20%.

2. The vehicle according to claim 1, wherein the cover layer includes a conductive material.

3. The vehicle according to claim 1, wherein the plurality of displays are disposed in a part of at least one of a dashboard, doors, seats, and B-pillars of the vehicle.

4. The vehicle according to claim 1, wherein the sensor includes an internal camera for capturing a person in the vehicle, and
wherein the controller is further configured to:
detect the seat location of the person seated in the vehicle based on an image received from the internal camera, and
turn on a specific display corresponding to the detected seat location of the person seated in the vehicle.

5. The vehicle according to claim 4, wherein the controller is further configured to:
identify the person seated in the vehicle based on the image received from the internal camera, and
display information corresponding to the identification of the person on the specific display.

6. The vehicle according to claim 1, further comprising:
an input unit configured to receive a user input,
wherein the controller is further configured to turn on and off a specific display corresponding to the user input.

7. The vehicle according to claim 6, wherein the input unit includes a microphone configured to receive voice of a user, and
wherein the controller is further configured to display information corresponding to the voice on the specific display.

8. The vehicle according to claim 1, wherein the controller is further configured to control a screen color of each display according to a preset scenario.

9. The vehicle according to claim 1, wherein the plurality of displays include a first display disposed at a first position and a second display disposed at a second position inside the vehicle, and
wherein the controller is further configured to display first information on the first display and second information different from the first information on the second display.

10. The vehicle according to claim 1, wherein the controller is further configured to turn off a specific display that does not receive a touch input for a predetermined time or longer from among the plurality of displays.

11. The vehicle according to claim 1, further comprising:
an external camera configured to capture surroundings of the vehicle,
wherein the controller is further configured to display an outside image received from the external camera on at least one display of the plurality of displays.

12. The vehicle according to claim 11, wherein the controller is further configured to:
detect an obstacle in the outside image, and
display information indicating a risk of colliding with the obstacle along with the outside image on the at least one display.

13. The vehicle according to claim 1, wherein the controller is further configured to turn on a specific display receiving a touch input of a predetermined pattern.

14. The vehicle according to claim 1, wherein the controller is further configured to perform an operation corresponding to a touch input sensed by a specific display among the plurality of displays.

15. The vehicle according to claim 1, further comprising:
a short-range communication module configured to wireless communicate with a mobile device located inside the vehicle,
wherein the controller is further configured to:
receive an image displayed on the mobile device through the short-range communication module, and
display the received image on the corresponding display.

16. The vehicle according to claim 1, further comprising:
a wireless Internet module configured to receive weather information about a current location of the vehicle from an external server,
wherein the controller is further configured to display the weather information on a specific display among the plurality of displays.

17. The vehicle according to claim 1, wherein the controller is further configured to control a screen brightness of each corresponding display according to a type of information displayed on the corresponding display.

18. The vehicle according to claim 1, wherein the controller is further configured to display an alarm indicator corresponding to at least one of a traveling situation and a location of the vehicle on the corresponding display.

19. The vehicle according to claim 1, wherein the sensor comprises at least one weight sensor disposed inside the vehicle, and
wherein the controller is further configured to display an alarm message indicating a presence of an object placed inside the vehicle on a specific display among the plurality of displays, based on a weight measured by the at least one weight sensor before the person gets out of the vehicle.

* * * * *